(12) United States Patent
Gladnick et al.

(10) Patent No.: US 8,317,347 B2
(45) Date of Patent: Nov. 27, 2012

(54) HIGH INTENSITY POINT SOURCE SYSTEM FOR HIGH SPECTRAL STABILITY

(75) Inventors: Paul Gerard Gladnick, Seattle, WA (US); Scott Allen Harsila, Bothell, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 191 days.

(21) Appl. No.: 12/977,018

(22) Filed: Dec. 22, 2010

(65) Prior Publication Data

US 2012/0162962 A1 Jun. 28, 2012

(51) Int. Cl.
*F21V 9/00* (2006.01)
*F21V 9/16* (2006.01)
(52) U.S. Cl. ............. 362/84; 362/231; 362/86; 362/284
(58) Field of Classification Search .................. 362/231, 362/86, 284, 249, 84; 313/512, 502, 503; 250/231.13; 257/98, 89, 91
See application file for complete search history.

(56) References Cited

U.S. PATENT DOCUMENTS

| | | | |
|---|---|---|---|
| 3,916,690 A | 11/1975 | Brandli | |
| 4,995,727 A | 2/1991 | Kawagoe | |
| 6,066,861 A | 5/2000 | Höhn | |
| 6,255,670 B1 | 7/2001 | Srivastava | |
| 6,417,019 B1 | 7/2002 | Mueller | |
| 6,641,448 B2 | 11/2003 | Wang | |
| 6,759,804 B2 * | 7/2004 | Ellens et al. | 313/512 |
| 6,765,237 B1 | 7/2004 | Doxsee | |
| 6,835,112 B2 | 12/2004 | Tanabe | |
| 7,026,755 B2 | 4/2006 | Setlur | |
| 7,083,490 B2 | 8/2006 | Mueller | |
| 7,088,038 B2 | 8/2006 | Srivastava | |
| 7,112,921 B2 | 9/2006 | Menkara | |
| 7,235,792 B2 | 6/2007 | Elofson | |
| 7,279,832 B2 | 10/2007 | Thurk | |
| 7,354,785 B2 | 4/2008 | Kabay | |

(Continued)

FOREIGN PATENT DOCUMENTS

EP 2 169 964 A2 3/2010

(Continued)

OTHER PUBLICATIONS

"Green Slim Projector XJ-A2551A250," Casio International, © 2010 Casio Computer Co., Ltd., Tokyo, <http://www.casio-intl.com/projector/xj_a255_250/> [retrieved Oct. 12, 2010], 6 pages.

(Continued)

*Primary Examiner* — Sang Nguyen
(74) *Attorney, Agent, or Firm* — Christensen O'Connor Johnson Kindness PLLC

(57) ABSTRACT

A system and method are provided for utilizing section contribution characteristic data to achieve accurate measurements by compensating for unwanted phosphor output variations that occur at specific sections of phosphor on a rotating high intensity phosphor point source element. Phosphor grain size, density, blend homogeneity, or illumination gap variations may cause the unwanted variations. Based on the section contribution characteristics, excitation energy compensation may provide a stable output illumination spectrum or computational compensation may correct measurements for effects arising from predictable output illumination spectrum variations. The section contribution characteristic data may comprise section wavelength intensity profile data and/or section efficiency data, in various embodiments. In some embodiments, the sections may be on the order of the size of the phosphor grains and may be characterized and compensated. The sections may include phosphor blends, or distinct phosphor types, in various embodiments.

22 Claims, 8 Drawing Sheets

U.S. PATENT DOCUMENTS

| | | | |
|---|---|---|---|
| 7,547,114 B2 | 6/2009 | Li | |
| 7,554,665 B2 | 6/2009 | Wadman | |
| 8,142,050 B2 * | 3/2012 | Emtman et al. | 362/231 |
| 8,217,412 B2 * | 7/2012 | Yuan et al. | 257/98 |
| 2002/0145728 A1 * | 10/2002 | Adams et al. | 356/72 |
| 2003/0015643 A1 | 1/2003 | Veith | |
| 2005/0105565 A1 | 5/2005 | Tobiason | |
| 2005/0208302 A1 | 9/2005 | Yi | |
| 2005/0255629 A1 | 11/2005 | Han | |
| 2006/0097621 A1 | 5/2006 | Park | |
| 2006/0109483 A1 | 5/2006 | Marx | |
| 2006/0282137 A1 | 12/2006 | Nightingale | |
| 2007/0019408 A1 | 1/2007 | McGuire, Jr. | |
| 2007/0131853 A1 * | 6/2007 | Chua et al. | 250/231.13 |
| 2009/0015157 A1 | 1/2009 | Sun | |
| 2009/0034284 A1 | 2/2009 | Li | |
| 2009/0284148 A1 | 11/2009 | Iwanaga | |
| 2010/0001256 A1 | 1/2010 | Coe-Sullivan | |
| 2010/0079730 A1 | 4/2010 | Shibasaki | |
| 2010/0097779 A1 | 4/2010 | Gladnick | |

FOREIGN PATENT DOCUMENTS

| | | |
|---|---|---|
| WO | 2006/133214 A2 | 12/2006 |
| WO | 2009/017992 A1 | 2/2009 |

OTHER PUBLICATIONS

Gosnell, J.D., et al., "Cadmium Selenide Nanocrystals as White-Light Phosphors," Sixth International Conference on Solid State Lighting, San Diego, Aug. 14, 2006, Proceedings of SPIE [Society of Photographic Instrumentation Engineers] 6337:63370A-1-63370A-9, Sep. 2006.

Happek, U., "Development of Efficient UV-LED Phosphor Coatings of Energy Saving Solid State Lighting," Final Report, DE-FC26-04NT41956, University of Georgia Department of Physics and Astronomy, Athens, Georgia, Jan. 2007, 12 pages.

European Search Report mailed Dec. 3, 2010, in EP Application No. 10 16 0735, filed Apr. 22, 2010, 2 pages.

Emtman, C., et al., "Phospor Wheel Configuration for High Intensity Point Source," U.S. Appl. No. 12/823,050, filed Jun. 24, 2010.

* cited by examiner

HIGH INTENSITY POINT SOURCE SYSTEM FOR HIGH SPECTRAL STABILITY

FIELD OF THE INVENTION

The invention relates generally to light sources and, more particularly, to high-intensity light sources suitable for use in precision measurement instruments, such as chromatic point sensors.

BACKGROUND OF THE INVENTION

Various uses are known for high-intensity broadband light sources. For example, it is known to use such light sources with chromatic confocal techniques in optical height sensors. In such an optical height sensor, as described in U.S. Patent Application Publication No. 2006/0109483 A1, which is incorporated herein by reference in its entirety, an optical element having axial chromatic aberration, also referred to as axial or longitudinal chromatic dispersion, may be used to focus a broadband light source such that the axial distance to the focus varies with the wavelength. Thus, only one wavelength will be precisely focused on a surface, and the surface height or position relative to the focusing element determines which wavelength is best focused. Upon reflection from the surface, the light is refocused onto a small detector aperture, such as a pinhole or the end of an optical fiber. Upon reflection from a surface and passing back through the optical system to the in/out fiber, only the wavelength that is well focused on the surface is well focused on the fiber. All of the other wavelengths are poorly focused on the fiber, and so will not couple power efficiently into the fiber. Therefore, for the light returned through the fiber, the signal level will be greatest for the wavelength corresponding to the surface height or position of the surface. A spectrometer type detector measures the signal level for each wavelength in order to determine the surface height.

Certain manufacturers refer to practical and compact systems that operate as described above and that are suitable for chromatic confocal ranging in an industrial setting as chromatic point sensors (CPS). A compact chromatically dispersive optical assembly that is used with such systems is referred to as an "optical pen." The optical pen is connected through the optical fiber to an electronic portion of the CPS, which transmits light through the fiber to be output from the optical pen and provides the spectrometer that detects and analyzes the returned light.

In known implementations, a Xenon arc lamp is used as a high intensity broadband (e.g., white) light source for a CPS having the measurement rate on the order of 30 kHz. A Xenon arc lamp provides broadband light emission that covers the spectral range and, hence, the height measurement range, of a CPS. It is also a high intensity light source with sufficient energy for obtaining a good S/N ratio at the measurement rate of about 30 kHz and the readout time of about 33 µs ($=1/30\times 10^{-3}$). However, in practical applications, a Xenon arc lamp exhibits certain undesirable characteristics, such as a less than desirable lifetime and arc spatial stability. A spatially stable, long lifetime light source is desirable in order to minimize any variation in CPS calibration due to changes in the light source spectral emission with arc movement, and also to minimize the downtime of a CPS. Further, many manufactured workpieces include hybrid materials, which have different reflectance characteristics and thus are saturated at different brightnesses. Thus, a CPS light source can preferably be brightness modulated (e.g., from less to more brightness) at a rate equal to or greater than the CPS measurement rate (e.g., 30 kHz) to allow measurement of hybrid materials. Such high rate light modulation is not practical with known Xenon arc lamps. Similar light source deficiencies are also found in association with other instrument applications, such as spectrometers, and the like.

U.S. Patent Application Publication No. 2010/0097779 A1 (the '779 Publication), which is commonly assigned and hereby incorporated herein by reference in its entirety, discloses a high intensity light source wherein a light emitting phosphor or the like is distributed on a movable member, which is moved continuously through a fixed illuminated spot and emitted light output coupling region. The disclosed configurations are superior to Xenon light sources in many respects, and are particularly suitable as high intensity light sources that have a long operating life, that provide high modulation rates, and that efficiently and economically couple light into an optical fiber, among other advantages. Thus, such light sources are well suited for CPS systems such as that outlined above, for example. However, the '779 Publication does not address the issue of phosphor output variations (e.g., at different locations on a phosphor point source element), which may affect the production of an illumination spectrum.

For various applications, improvements in the operation of various aspects of such high intensity light sources (e.g., utilizing light emitting phosphor) would be desirable (e.g., the ability to address phosphor output variations.)

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention is directed to providing a system and method for determining and utilizing section contribution characteristic data to achieve accurate measurements by compensating for phosphor output variations that occur at specific sections of the phosphor on a phosphor point source element used for high intensity illumination. The inventor has found that operation of phosphor light sources such as those disclosed in the '779 Publication, or the like, may be further enhanced by the features of the systems and methods disclosed herein. In particular, undesirable variations in the intensity of constituent wavelengths of an illumination spectrum output by a light source may be measurably improved or compensated, which is useful in a number of applications. For example, compensation may be provided to overcome minute variations in the characteristics of the light emitting phosphor structure on the movable substrate. In various embodiments, physical compensation may be used to provide a more stable or predictable illumination spectrum (also referred to as an illumination wavelength intensity profile), or computational compensation may be used to correct measurements for predictable illumination spectrum variations. Certain elements and methods disclosed herein may be used to provide an improved illumination system comprising a light emitting phosphor structure on a movable substrate, wherein the elements and methods may be used to economically reduce variations in the intensity of constituent wavelengths of an illumination spectrum to a practical minimum. It should be appreciated that the term phosphor is used generically herein to refer to any composition that absorbs radiation at one wavelength range and emits radiation at another wavelength range (e.g., including conventional phosphor materials, photoluminescent semiconductor nanoparticles or nanocrystals, or Q-particle phosphors commonly called quantum dots or semiconductor quantum dots, or zinc oxide nanorods, or the like). The term "light" is used generically to refer to radiation, whether visible or not.

In various embodiments disclosed herein, an illumination system comprises a phosphor point source element comprising phosphor material along a circular operational track, which is rotated about an axis, the phosphor material along the circular operational track outputting illumination light in response to excitation energy; an excitation light source arranged to provide excitation energy at an illuminated spot on the operational track; an output path optical element set which is fixed relative to the spot on the operational track and which receives illumination light from phosphor material proximate to spot; and a processor configured to control at least the excitation light source such that the illumination system provides an output illumination spectrum comprising illumination light output through the output path optical element set during an illumination period. In the illumination system, a plurality of sections comprising the phosphor material are defined at respective section locations around the operational track. Each of the plurality of sections has a respective section contribution characteristic, which is defined to be characteristics indicative of variations in the contributions of the respective sections with respect to illumination light. The illumination system is configured such that for a respective illumination period, the output illumination spectrum comprises illumination light output by a respective output contribution set of N sections during that illumination period; and the illumination system is configured to operate in (or perform a method according to) at least one of the configurations (A), (B), (C), and (D) in order to allow output illumination spectrum compensation according to the section contribution characteristics, wherein, in configuration (A), N is at least two and the excitation light source is controlled such that a respective section excitation energy provided at each of the N sections is based on their respective section contribution characteristics to substantially eliminate unwanted variations with respect to illumination light provided by the output contribution set, such that the output illumination spectrum is a compensated output illumination spectrum; in configuration (B), N is at least two, and the members of the output contribution set of N sections have respective section contribution characteristics such that for a respective section excitation energy provided at each of the N sections unwanted variations between the contributions of the N sections with respect to illumination light provided by the output contribution set at least partially compensate one another, such that the output illumination spectrum is a compensated output illumination spectrum; in configuration (C), N is at least one, and the illumination system is configured to provide illumination spectrum compensation data based at least on the section contribution characteristics of the N sections of the output contribution set, to a host system, such that a measurement based on an output illumination spectrum arising from the output contribution set may be compensated for unwanted variations in the output illumination spectrum (e.g., computationally compensated); and in configuration (D), N is at least one, and the illumination system is configured to use an output contribution set having the same N sections during a plurality of illumination periods, such that each illumination period that uses the output contribution set having the same N sections provides the same output illumination spectrum. A compensated output illumination spectrum (e.g., in configurations (A) and/or (B)) is an output illumination spectrum that matches a desired, standard, or default illumination spectrum (e.g., the output illumination spectrum exhibits the expected relationships between the energy levels of its wavelength constituents or components). Unwanted variations are variations relative to a desired, standard, or default output level from a section (e.g., relative to other sections included in the output contribution set, or relative to an expected contribution to a desired, standard, or default output illumination spectrum).

In other words, in various embodiments, locations or sections around the operational track of the phosphor point source element have respective section contribution characteristic(s) that vary from one another and/or from an ideal illumination contribution associated with the type of phosphor material (e.g., a blended phosphor or a specific type of phosphor). The illumination system is configured such that undesirable variations in the section contribution characteristic(s) at the various sections may be compensated by control of the excitation light source such that a compensated output illumination spectrum does not include the effects of the undesirable variation, or such that the output illumination spectrum includes predictable effects from the undesirable variations, and the corresponding section contribution characteristic(s) may be used to compensate measurements including the predictable effects of the undesirable variations.

In various embodiments, each respective section contribution characteristic comprises at least one of a section efficiency characteristic indicative of an overall energy conversion efficiency of that section and a section wavelength intensity profile characteristic indicative of the relative energy levels of wavelength components that are output at that section. In some embodiments, the illumination system comprises a section data memory, and respective section data corresponding to the respective section contribution characteristics is stored in the section data memory for a plurality of sections.

In some embodiments, the respective section data comprises section wavelength intensity profile characteristic data based on an actual measurement of the corresponding section. In some such embodiments, each of the plurality of sections comprises blended phosphor material that provides a broadband output illumination spectrum, and the illumination system is configured to operate in configuration (C), wherein the illumination system is configured to output illumination spectrum compensation data, based on at least the section wavelength intensity profile characteristic data of the output contribution set of N sections, to the host system such that a measurement based on the broadband output illumination spectrum arising from the output contribution set of N sections may be compensated for unwanted variations in that broadband output illumination spectrum which correspond to the section wavelength intensity profile characteristics of that output contribution set of N sections. In some such embodiments, N is at least two, the respective section data also comprises section efficiency characteristic data, the illumination system is configured such that respective section excitation energies provided at each of the N sections of the output contribution set are known relative to one another, and the illumination system is configured to output illumination spectrum compensation data based on at least the section efficiency characteristic data and the section wavelength intensity profile characteristic data of the output contribution set of N sections to the host system, such that a measurement based on the broadband output illumination spectrum arising from the output contribution set of N sections may be compensated for unwanted variations in that broadband output illumination spectrum which corresponds to the section efficiency characteristics and the section wavelength intensity profile characteristics of that output contribution set of N sections. In some such embodiments, if all the respective excitations energies of the N sections are known to be the same, then the output illumination spectrum compensation data need not be based on the respective excitations energies. However, in some such embodiments, the respective known excitations energies of the N sections may be different and the output illumination spectrum compensation data may then be based on at least the section efficiency characteristic data, the section wavelength intensity profile characteristic data, and the respective section excitation energies provided at each of the output contribution set of N sections that are known relative to one another.

In various embodiments, the excitation energy used at each section may be known based on a known or standard excitation drive level or based on an energy monitor signal.

In some embodiments, the respective section data corresponding to the respective section contribution characteristics comprises section efficiency characteristics, and each respective section efficiency characteristic is based on an actual measurement of the corresponding section (e.g., a measurement of the output of that section relative to a standard or known excitation energy level and/or in comparison to the output of other sections relative to a standard or known excitation energy level).

In some such embodiments, each section of the output contribution set of N sections comprises a respective phosphor material that contributes to a respective portion of a broadband output illumination spectrum; the illumination system is configured to operate in configuration (C), wherein N is at least two, the illumination system is configured such that respective section excitation energies provided at each of the output contribution set of N sections are known relative to one another, and the illumination system is configured to output illumination spectrum compensation data, based on at least the section efficiency characteristic data of the output contribution set of N sections, to the host system such that a measurement based on the broadband output illumination spectrum arising from the output contribution set of N sections may be compensated for unwanted variations in that broadband output illumination spectrum which correspond to the section efficiency characteristics of that output contribution set of N sections. In some such embodiments, the respective section data also comprises section wavelength intensity profile characteristic data, and the illumination system is configured to output illumination spectrum compensation data, based on at least the section efficiency characteristic data and the section wavelength intensity profile characteristic data of the output contribution set of N sections, to the host system such that a measurement based on the broadband output illumination spectrum arising from the output contribution set of N sections may be compensated for unwanted variations in that broadband output illumination spectrum which correspond to the section efficiency characteristics and the section wavelength intensity profile characteristics of that output contribution set of N sections. In some such embodiments, the section wavelength intensity profile characteristic data for each respective section may comprise at least one of (a) identification of its respective type of phosphor material, (b) generic wavelength intensity profile characteristic data corresponding to its respective type of phosphor material, and (c) measured wavelength intensity profile characteristic data. In some such embodiments, if all the respective excitations energies of the N sections are known to be the same, then the output illumination spectrum compensation data need not be based on the respective excitations energies. However, in some such embodiments, the respective known excitations energies of the N sections may be different, and the output illumination spectrum compensation data may then be based on at least the section efficiency characteristic data, the section wavelength intensity profile characteristic data, and the respective section excitation energies provided at each of the output contribution set of N sections that are known relative to one another.

In some embodiments, each section of the output contribution set of N sections comprises a respective phosphor material that contributes to a respective portion of a broadband output illumination spectrum and the illumination system is configured to operate in configuration (A). In some such embodiments, the section efficiency characteristic data for each respective section comprises at least one of (a) a section efficiency value, and (b) an excitation energy control value that compensates for the section efficiency characteristic.

In some embodiments, the illumination system is configured to control at least one of the power level and the operating duration of the excitation light source in each of the N sections in order to control the respective section excitation energy provided in each of the N sections. In some such embodiments, the illumination system is configured such that the power level of the excitation light source is the same in each of the N sections and the processor controls the operating duration of the excitation light source in each of the N sections in order to control the respective section excitation energy provided at each of the N sections.

In some embodiments, the illumination spot has a dimension D along the direction of the operational track, and at least some of the N sections have a dimension SL along the direction of the operation track which is less than 20 D, or in some embodiments less than 10 D. In some embodiments, the dimension D is at most 200 microns and includes at least 90% of the energy of the illumination spot.

In some embodiments, the illumination system is configured to operate in configuration (B).

In some embodiments, the illumination system is configured to operate in configuration (D) in conjunction with at least one of the configurations (A), (B), and (C).

In various embodiments, the section contribution characteristic data corresponding to a section may comprise wavelength intensity profile data (sometimes referred to as spectral intensity profile data) such as a wavelength intensity profile characteristic (WIPCi) for a section i, which characterizes the relative energy levels for the various wavelength components that are output at that section. A "wavelength component" may be regarded as corresponding to a small wavelength range, for instance, a small wavelength range increment which is detected by a single detector element (e.g., a pixel or array element) in a spectrometer or other instrument that provides measurements derived from an illumination spectrum output by a light source that operates as disclosed herein. In some embodiments, the wavelength intensity profile data is determined based on a measurement of the actual wavelength intensity profile (sometimes referred to as the actual spectral intensity profile) at that section resulting from a known or standard excitation energy. In some embodiments, the wavelength intensity profile data is determined based on a predetermined generic wavelength intensity profile corresponding to the phosphor(s) at that section (e.g., according to a predetermined phosphor output specification, preliminary test of a representative phosphor sample, or the like).

In some embodiments, the section contribution characteristic data corresponding to a section may comprise a section efficiency characteristic (SECi) for a section i, which generally reflects the relative efficiency of a phosphor section for converting excitation energy to illumination energy (e.g., in comparison to other sections, or a "reference," having the same phosphor composition). In one embodiment, the section efficiency characteristic may characterize the nominal energy output at that section relative to a reference energy level and/or relative to a given excitation energy level. In one embodiment, the section efficiency characteristic data comprises a section efficiency characteristic value that characterizes the output energy for a representative wavelength or wavelength profile for that section, relative to a reference level. In some embodiments, the section efficiency characteristic value may be a ratiometric value based on a measurement of the output energy at that section relative to the excitation energy used to generate that output energy (e.g., where the excitation energy has a measured or a standard value). In other embodiments, the value may be a ratiometric value based on a measurement of the output energy at that section relative to the output energy at another section that has nominally the same phosphor composition for nominally identical excitation energy at both sections.

In some embodiments, the section contribution characteristic data corresponding to a section may comprise both wavelength intensity profile data and section efficiency characteristic data. In some embodiments, the wavelength intensity profile data and the section efficiency characteristic data may be separate data elements (e.g., in one particular embodiment the wavelength intensity profile data for a section may be a predetermined wavelength intensity profile and its section efficiency characteristic data may be based on an actual measurement, as outlined above). In some embodiments, the wavelength intensity profile data may inherently include the section efficiency characteristic data. For example, in one particular embodiment, the wavelength intensity profile data may be determined based on a measurement of the actual wavelength intensity profile at a section resulting from a known or standard excitation energy. Therefore, the relative energy output (that is, the section efficiency characteristic information) at comparable sections (e.g., sections having the same phosphor composition) may be derived from their respective wavelength intensity profile data.

In some embodiments, a desired illumination spectrum may be determined for illumination operations (e.g., during an illumination period of the illumination system.) Stored characterization data is then recalled and control signals are determined for producing the desired illumination spectrum (e.g., a set of sections is determined on the phosphor disk, which is to be excited during the illumination period and corresponding control signals are also determined for excitation laser timing and/or intensity, etc.). During the illumination operations, signals indicating the position of the rotating disk are received (e.g., in one specific implementation, signals are received from 3 Hall sensors positioned at 120° phase used as absolute position sensors for the angular location of the disk during the illumination period) and the control signals are implemented (e.g., for excitation laser timing and/or intensity, etc.) for producing the desired illumination spectrum during the illumination period. In one specific example implementation, a bit stream may be sent to an excitation laser, with some ON and some OFF, so as to excite specific sections on the phosphor point source element over time and yield a desired illumination spectrum over time (e.g., a preprogrammed "white" spectrum.)

In some embodiments, a measurement instrument (e.g., a chromatic point sensor) is utilized to obtain measurements determined based on measurement samples wherein the phosphor point source element is utilized for the illumination in the measurement instrument. Then, for each measurement sample, based on a desired or default illumination spectrum, the respective sections around the operational track and respective excitation levels used to illuminate the measurement sample are defined (e.g., during its respective illumination period). The stored characterization data that is associated with the defined respective sections and the respective excitation levels are then utilized for normalization of the respective measurements.

BRIEF DESCRIPTION OF THE DRAWINGS

The foregoing and other aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENTS

Figure 1:
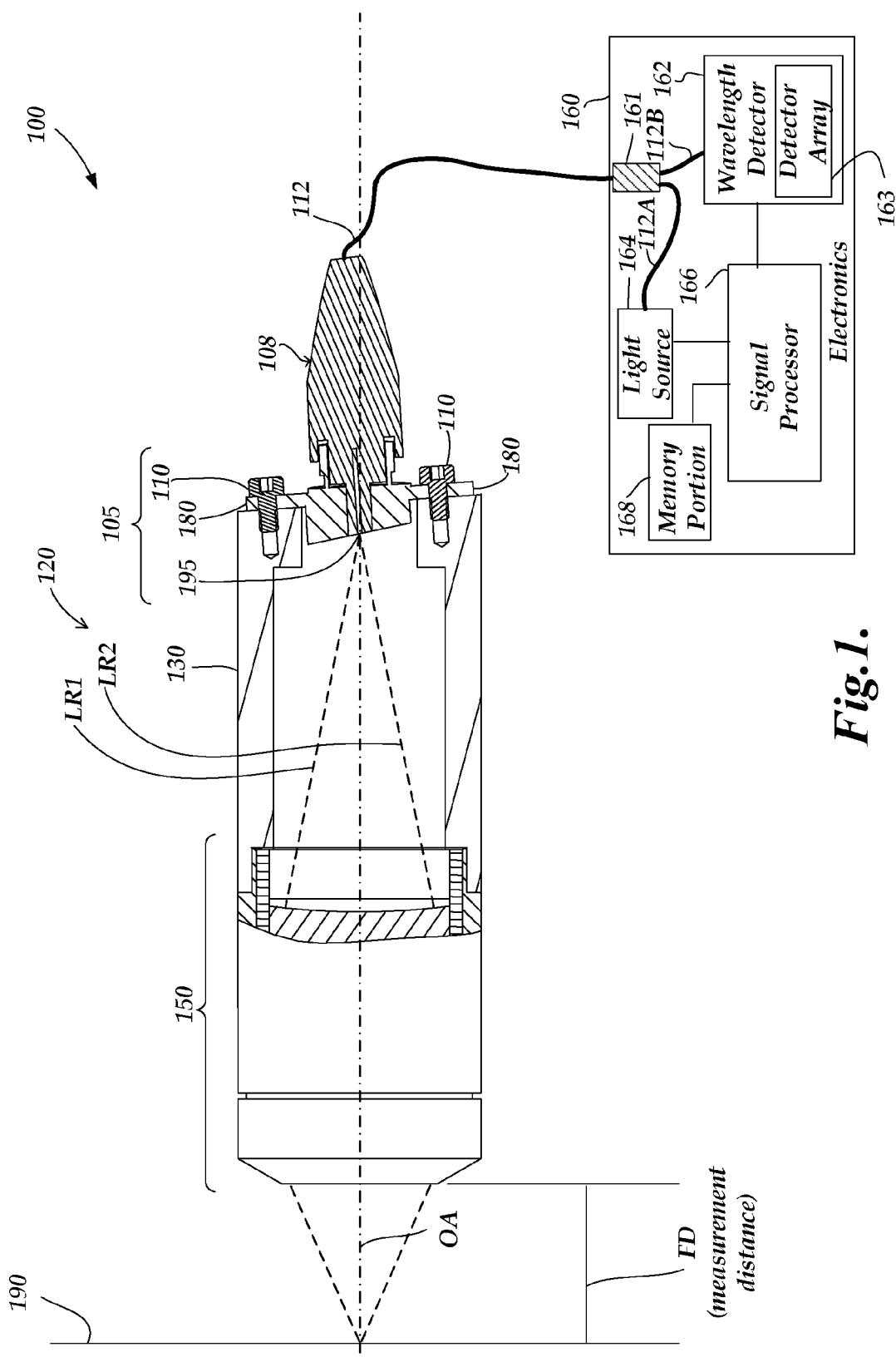
FIG. 1 is a block diagram of an exemplary chromatic point sensor in which a light source using a phosphor point source element may be utilized.

To provide context for one application of the present invention, the following description of FIG. 1 generally illustrates how a light source (e.g., using a phosphor point source element as disclosed herein) may be utilized in a chromatic point sensor (CPS) system. It should be appreciated that CPS systems are expensive high-performance measurement systems that benefit from a light source (e.g., an illumination system) that is compatible with fiber optic illumination. The performance and value of CPS systems may be enhanced by higher sample rates (e.g., using short bursts of high-intensity illumination), and more repeatable illumination spectra, which may result in improved accuracy in the measurements taken with such systems. Generally speaking, an illumination system and/or related operating method that can provide a measurable improvement in any of these factors can also provide a measurable improvement in the performance and value of a CPS system that hosts the illumination system. Thus, illumination system features and/or illumination compensation improvements such as those disclosed herein, which are particularly compatible with fiber optic illumination systems, may be particularly valued in a CPS system. It should be apparent to those skilled in the art, however, that the improvements disclosed herein may be applied to advantage in various other systems as well, such as other precision measurement instruments (e.g., spectrometers or the like).

FIG. 1 is a block diagram of an exemplary chromatic point sensor 100. As shown in FIG. 1, the chromatic point sensor 100 includes an optical pen 120 and an electronics portion 160. The optical pen 120 includes an in/out fiber optic sub-assembly 105, a housing 130, and an optics portion 150. The in/out fiber optic sub-assembly 105 includes a mounting element 180 that may be attached to the end of the housing 130 using mounting screws 110. The in/out fiber optic sub-assembly 105 receives an in/out optical fiber (not shown) through a fiber optic cable 112 which encases it, and through a fiber optic connector 108. In one embodiment, the in/out optical fiber may be a multi-mode fiber (MMF) with a core diameter of about 50 microns. In other embodiments, larger or smaller core diameters and/or taper fibers may be used. The in/out optical fiber outputs an output beam through an aperture 195 and receives reflected measurement signal light through the aperture 195.

In operation, light emitted from the fiber end through the aperture 195 is focused by the optics portion 150, which includes a lens that provides an axial chromatic dispersion such that the focal point along the optical axis OA is at different distances depending on the wavelength of the light, as is known for chromatic confocal sensor systems. The light is focused on a workpiece surface 190. Upon reflection from the workpiece surface 190, the reflected light is refocused by the optics portion 150 onto the aperture 195 as illustrated by the limiting rays LR1 and LR2. Due to the axial chromatic dispersion, only one wavelength will have the focus distance FD that matches the measurement distance from the optical pen 100 to the surface 190. The wavelength that is best focused at the surface 190 will also be the wavelength of the reflected light that is best focused at the aperture 195. The aperture 195 spatially filters the reflected light such that predominantly the best focused wavelength passes through the aperture 195 and into the core of the optical fiber cable 112. The optical fiber cable 112 routes the reflected signal light to a wavelength detector 162 that is utilized for determining the wavelength having the dominant intensity, which corresponds to the measurement distance to the workpiece surface 190.

The electronics portion 160 includes a fiber coupler 161, an optical fiber 112B between the fiber coupler 161 and the wavelength detector 162, an optical fiber 112A between the fiber coupler 161 and a light source 164, a signal processor 166, and a memory portion 168. The wavelength detector 162 includes a spectrometer arrangement wherein a dispersive element (e.g., a grating) receives the reflected light through the optical fiber cable 112, the optical coupler 161, and optical fiber 112B and transmits the resulting spectral intensity profile (also sometimes referred to as the resulting wavelength intensity profile or the resulting measurement spectrum) to a detector array 163.

The light source 164, which is controlled by the signal processor 166, is coupled to the optical fiber 112A and through the optical coupler 161 (e.g., a 2×1 optical coupler) to the fiber cable 112. As described above, the light travels through the optical pen 120, which produces longitudinal chromatic aberration so that its focal length changes with the wavelength of the light. The wavelength of light that is most efficiently transmitted back through the fiber is the wavelength that is in focus on the surface 190. The reflected wavelength-dependent light intensity then passes through the fiber coupler 161 again so that approximately 50% of the light is directed to the wavelength detector 162, which receives the spectral intensity profile distributed over an array of pixels along a measuring axis of the detector array 163 and operates to provide corresponding profile data. The measurement distance to the surface is determined via a distance calibration lookup table which is stored in the memory portion 168. Since the measurement result depends on the detected wavelength intensity profile, the illumination wavelength intensity profile of the illumination that is provided by the light source 164 propagates through the system to influence the overall measurement result. For example, if the distribution of energy in the illumination wavelength intensity profile shifts, the wavelength of the peak of the detected wavelength intensity profile (which indicates the desired measurement value in many measurement systems) will shift in a related manner. However, the wavelength peak of the detected wavelength intensity profile may be nominally insensitive to the overall or average energy in the illumination wavelength intensity profile, so long as the relative distribution of energy among its constituent wavelength remains stable (e.g., the energy in each constituent wavelength may change by the same percentage without affecting the distribution of energy or "shape," which is the illumination wavelength intensity profile). Thus, a stable and/or predictable illumination wavelength intensity profile (e.g., provided according to principles disclosed herein) is most desirable. The light source 164 may advantageously comprise a phosphor-based high intensity light source using a phosphor point source element and other features disclosed herein, as described in more detail below.

Figure 2:
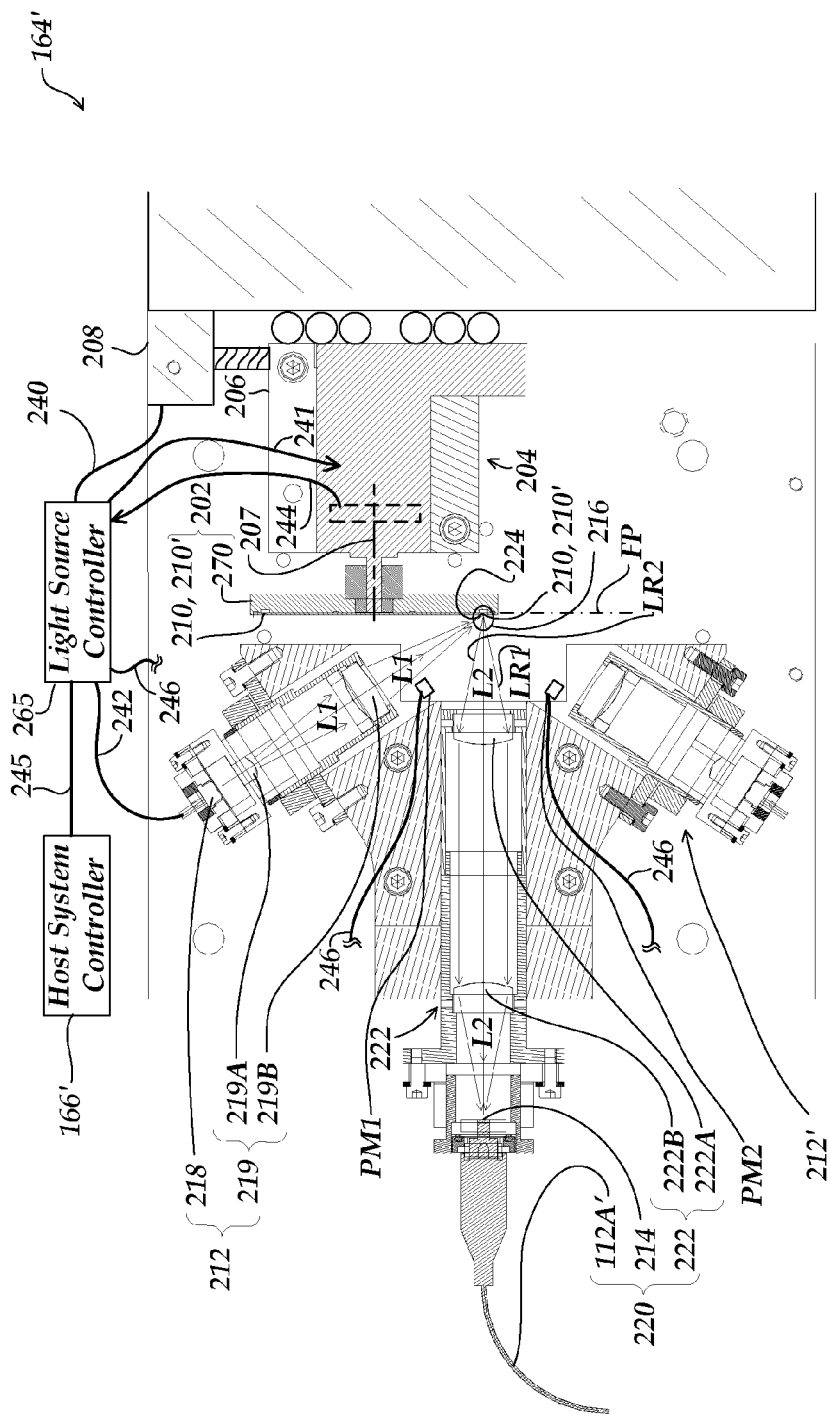
FIG. 2 is a plan cross section diagram of a light source including a light source controller, a rotary actuator, and a phosphor point source element.

FIG. 2 is a plan cross section view showing a light source configuration 164' including a phosphor point source element 202 usable in various embodiments disclosed herein. The light source configuration 164' and phosphor point source element 202 are described in more detail in copending and commonly assigned U.S. patent application Ser. No. 12/823, 050, titled "Phosphor Wheel Configuration for High Intensity Point Source," filed Jun. 24, 2010, which is hereby incorporated by reference in its entirety. As described in the '050 Application, the light source configuration 164' may be used in various applications, for example, as the light source 164 illustrated in FIG. 1. Accordingly, the light source 164' may be coupled to a host system controller 166' (e.g., a CPS controller/signal processor) through a signal line(s) 245 and optically coupled to a host system light application (e.g., an optical pen) through an optical fiber 112A' (e.g., the optical fiber 112A and/or 112 shown in FIG. 1). Certain aspects of how light sources utilizing a phosphor point source element operate and may be coupled to such systems are described in more detail in the previously incorporated '779 Publication.

As shown in FIG. 2, the light source configuration 164' includes the phosphor point source element 202 mounted to a movable member actuator 204 comprising a rotary actuator 206 (e.g., a miniature precision rotary motor), which may optionally be mounted to a linear actuator 208 (e.g., a miniature precision linear motor or motor and lead screw). In the illustrated embodiment, the phosphor point source element 202 comprises a substrate 270 and a phosphor region 210' that includes an operational track region 210. The phosphor point source element 202 is rotated around an axis 207 that extends generally perpendicular to a surface of the operational track region 210 of the phosphor point source element 202 in the illustrated embodiment. In some embodiments, the phosphor point source element 202 may have a diameter on the order or 10-75 millimeters or more, and may be rotated at up to 40,000 RPM or more.

In the embodiment shown in FIG. 2, the light source configuration 164' also includes at least a first excitation light source 212, an output path optical element set 220, and a light source controller 265 operably connected to the linear actuator 208 through power and/or signal line(s) 240, the rotary actuator 206 through a power and/or signal line(s) 241, and the first excitation light source 212 through power and/or signal line(s) 242. Additional signals may also be received and utilized by the light source controller 265 for controlling the operation of the light source 164', as will be described in more detail below with respect to FIG. 6. For example, a position signal line 244 may carry signals received from sensors associated with the rotary actuator 206, in order to indicate the rotational position of the phosphor point source element 202. In addition, an energy monitor signal line 246 may carry a signal received from a first energy monitor PM1 which may be configured such that it provides a signal proportional to the energy or power of the excitation input light L1 provided by the first excitation light source 212 (e.g., by including a wavelength filter selected to pass the wavelength of light in the excitation input light L1), or the energy or power of the output illumination light L2 (e.g., by including a wavelength filter selected to pass the wavelengths of light in the illumination light L2). Optionally, a second energy monitor PM2 may be provided for a similar purpose. A signal proportional to the energy or power of the excitation input light L1 may be used in controlling the excitation input light L1 to a desired level based on a known section efficiency characteristic of a section, such that a corresponding level of output illumination light L2 that is output from a section may be controlled to a desired level or estimated as a basis for compensation. In contrast, an energy or the power of the output illumination light L2 may be based on the known section wavelength intensity profile characteristic of a section (with or without knowing the section efficiency characteristic) such that a corresponding level of output illumination light L2 that is output from a section provides a proper weighting for the wavelength components contributed by that section relative to the wavelength components that are to be contributed by other sections during an illumination period, such that an overall output illumination spectrum may be compensated to be a desired spectrum, or else the relative strengths of its wavelength components may be estimated as a basis for compensation.

The input light L1 from the excitation light source 212 illuminates the operational track region 210 of the phosphor point source element 202 at an illuminated spot 224, as described in greater detail below. As the name implies, the operational track region 210 is a track that is actually illuminated by the input light L1 and actually emits an output illumination light L2. The operational track region 210 may comprise some or approximately all of a broader light-emitting phosphor region (or composition) 210', in various embodiments.

In some embodiments, the light-emitting phosphor region 210' may comprise a light emitting phosphor, or the like, of a type suitable for producing narrow band light. In some embodiments, the light-emitting phosphor region 210' may comprise light emitting phosphors, or the like, of a suitable type or types that are blended for producing broadband light (e.g., 400-700 nm, which may be useful in a CPS system application). For example, the phosphor blend may include a combination of a blue-emitting phosphor, a green-emitting phosphor, and/or a red-emitting phosphor. Phosphor blends of a suitable type for producing broadband light are disclosed in U.S. Pat. Nos. 6,255,670; 6,765,237; 7,026,755; and 7,088,038, which are incorporated herein by reference. These patents describe phosphor blends in intimate or proximate contact with continuous-wave UV LED to output broadband light. Alternatively or additionally, phosphor blends of a suitable type for producing broadband light are disclosed in U.S. Pat. Nos. 6,066,861; 6,417,019; and 6,641,448, which are incorporated herein by reference. These patents describe YAG-Ce$^+$-based phosphor blends that absorb continuous blue LED light and output broadband light. Alternatively or additionally, phosphor blends of a suitable type for producing broadband light may include differently sized photoluminescent semiconductor nanoparticles such as disclosed in U.S. Pat. No. 7,279,832, or nanocrystalline materials such as disclosed in U.S. Pat. No. 7,235,792, or semiconductor nanocrystals such as disclosed in U.S. Pat. No. 7,083,490, each of which is hereby incorporated herein by reference in their entirety (later referred to as the '832 Patent, the '792 Patent, and the '490 Patent, respectively). Alternatively or additionally, phosphor blends of a suitable type for producing broadband light may include nanostructures based on zinc oxide nanorods such as disclosed in U.S. Patent Application Publication No. 2005/0255629, which discloses zinc oxide nanorods exhibiting photoluminescent properties, and in U.S. Patent Application Publication No. 2005/0208302, which discloses zinc oxide nanorods as a nano-material for a nano-material/phosphor hetero-structure in a white light source (referred to as the '629 Publication and the '302 Publication, respectively). Thus it should be appreciated that the term "light-emitting phosphor" is used generically herein to refer to these and any other suitable light emitting materials which may be configured or used according to the principles disclosed herein.

In addition, as described in the '050 Application and the '779 Publication, in certain embodiments the light-emitting phosphor region may also comprise a plurality of pockets or sub-regions of different types of phosphor particles. One specific example of such a configuration with variably sized pockets will be described in more detail below with respect to FIG. 10. Different wavelengths of light output from the different types of phosphor particles may be integrated over time (e.g., using the photodetector of a measurement instrument) to provide a desired cumulative output illumination spectrum over a measurement or illumination period. Thus, it will be appreciated that various configurations for the light-emitting phosphor region may be provided for use in the light source 164'.

To briefly outline the basic operation of the light source 164', the first excitation light source 212 generates an input light L1, which illuminates the operational track region 210 of the phosphor point source element 202 at an illuminated spot 224. The illuminated spot 224 is fixed relative to an emitted light output coupling region 216. The light source controller 265 operates the rotary actuator 206 to provide at least one speed (e.g., 2.5 m/s, 10 m/s, or even 50 m/s or more, in various embodiments and/or applications) of the operational track region 210 across the illuminated spot 224, in order to reduce optical quenching and minimize photobleaching as described in the incorporated '779 Publication, along the operational track region 210. The light-emitting phosphor of the operational track region 210 located proximate to the illuminated spot 224 emits light into the emitted light output coupling region 216. Specifically, the active light-emitting portion of the operational track region 210 absorbs the input light L1 having a first wavelength (or wavelength range), and emits output illumination light L2 having a second wavelength range different from the first wavelength. In some embodiments, an emitted light output coupling region may be defined as the region that produces emitted light that is actually coupled into the end of an output optical fiber, (e.g., the output illumination light L2 that is coupled into the fiber end 214). In various other embodiments where the emitted light is output to an undefined element that is included in a host system or the like, an emitted light output coupling region may be defined to be coextensive with an excited phosphor spot surrounding the illuminated spot 224. In any case, output illumination light L2 in the emitted light output coupling region 216 is input to the output light path optical element set 220 (e.g., including the fiber end 214 and the optical fiber 112A') and may be provided as illumination to a host system.

In the embodiment shown in FIG. 2, the excitation light source 212 comprises a light generator 218, which can be controlled to provide short high intensity pulses as outlined in the incorporated '779 Publication (e.g., a laser light source, such as a 500 mW or 1 W violet diode laser, which may be pulsed at a KHz or MHz rate) and an input light path optical element set 219 comprising the input lenses 219A and 219B, which may provide a tightly focused illuminated spot 224, which allows the resulting localized output illumination light L2 to be efficiently coupled into the fiber end 214. For example, in some embodiments, a surface of the operational track region 210 may be located approximately at a focal plane FP of the input light path optical element set 219, and the resulting illuminated spot 224 may have a diameter on the order of 5-10 microns, or in other embodiments, the illuminated spot 224 may have a diameter on the order of 100-150 microns. In some embodiments, the light-emitting operational track region 210 may emit light from an excited phosphor spot that is larger than and surrounds the illuminated spot 224 (e.g., with an excited spot diameter of 150 microns).

In the embodiment shown in FIG. 2, the output light path optical element set 220 includes an optical fiber 112A' including a fiber end 214, and an collection optics 222 comprising the lenses 222A and 222B. However, in some embodiments such as those disclosed in the incorporated '779 Publication, the collection optics 222 may be omitted, and the fiber end 214 may be mounted in close proximity to the light-emitting operational track region 210 and the emitted light output coupling region 216 (e.g., within 100-300 um, in some embodiments) in order to directly receive the output illumination light L2. When the output light path optical element set 220 includes the collection optics 222, the focal plane FP may be a focal plane FP of the elements of the input light path optical element set 219 or a focal plane FP of the collection optics 222, or both.

As described in greater detail in the '050 Application, for points on the surface of a phosphor particle that are not proximate to the focal plane FP, some of the light emitted within an angular range corresponding to the acceptance angle of the collection optics 222 will be not be input and/or transmitted through the output light path optical element set 220 because it falls outside of the limiting rays LR1 and LR2 of the output light path optical element set 220. Thus, the proportion of light that is actually output from a point on a phosphor particle through a focused output light path optical element set 220 depends on the distance of that point from the focal plane FP. Accordingly, an "uneven" phosphor surface in the operational track region 210 would contribute to significant output intensity variations as it moves in a light source that uses a focused output light path optical element set 220, such as that shown in FIG. 2. Furthermore, if the light source includes an input light path optical element set 219 that is also focused at the focal plane FP, the size and average intensity within the resulting illuminated spot 224 in the operational track region 210 will vary depending on the distance of the phosphor surface in the operational track region 210 from the focal plane FP, which may also contribute to output intensity variations in "uneven" phosphor surfaces. Another source of output intensity variation may come from variations in phosphor particle size or density, in that the illuminated spot may have a size on the order of the particle size, such that measurable variations in the actual area or volume of light emitting phosphor material in the illumination spot may occur. The foregoing variations may be such that the relative energy levels at various wavelengths within an expected or nominal wavelength intensity profile for the phosphor(s) at a particular location or section are not significantly affected, but the overall or average energy level output at that particular location or section is affected. Such an "average energy" effect is referred to as a section efficiency characteristic (SECi) for a section i, in that it generally reflects the relative efficiency of a phosphor section for converting excitation energy to illumination energy (e.g., in comparison to other sections, or a "reference," having the same phosphor composition).

Another source of output intensity variation may be due to minute phosphor composition and/or output spectrum variations relative to an average or expected phosphor composition or output spectrum. The features and methods described in the incorporated '779 Publication and '050 Application provide means for reducing the causes of the variations outlined above to a practical minimum. However, the causes of the variations may not be perfectly eliminated at a desirable level of effort or cost. In such cases, the features and methods disclosed herein may be used to reduce or eliminate the effects of the remaining variations, as outlined above and described in greater detail below.

Regarding various optional features shown in FIG. 2, in some embodiments a second excitation light source 212' may be included to increase the light intensity that can be provided by the light source 164'. The second excitation light source 212' may be configured and controlled similarly to the first light source 212. In other embodiments, additional analogous excitation light sources may be added, if desired. As previously noted, the linear actuator 208 is also optional in some embodiments. When the movable member actuator 204 includes the linear actuator 208, the rotary actuator 206 is configured and controlled to rotate the phosphor point source element 202 while the linear actuator 208 is configured and controlled to linearly displace the phosphor point source element 202 relative to the illuminated spot 224, for example, radially inward to provide a fresh operational track region 210 in the light-emitting phosphor region 210' should one track become reduced in efficiency or otherwise damaged. In any case, relative motion of the operational track region 210 relative to the illuminated spot 224 allows the operational track region 210 to generate high intensity light in a sustained manner, to thereby support high intensity strobe cycles (e.g., with an exposure time on the order of 50 µs, 33 µs, or less) over a long lifetime, as outlined in the incorporated '779 Publication.

Figure 3:
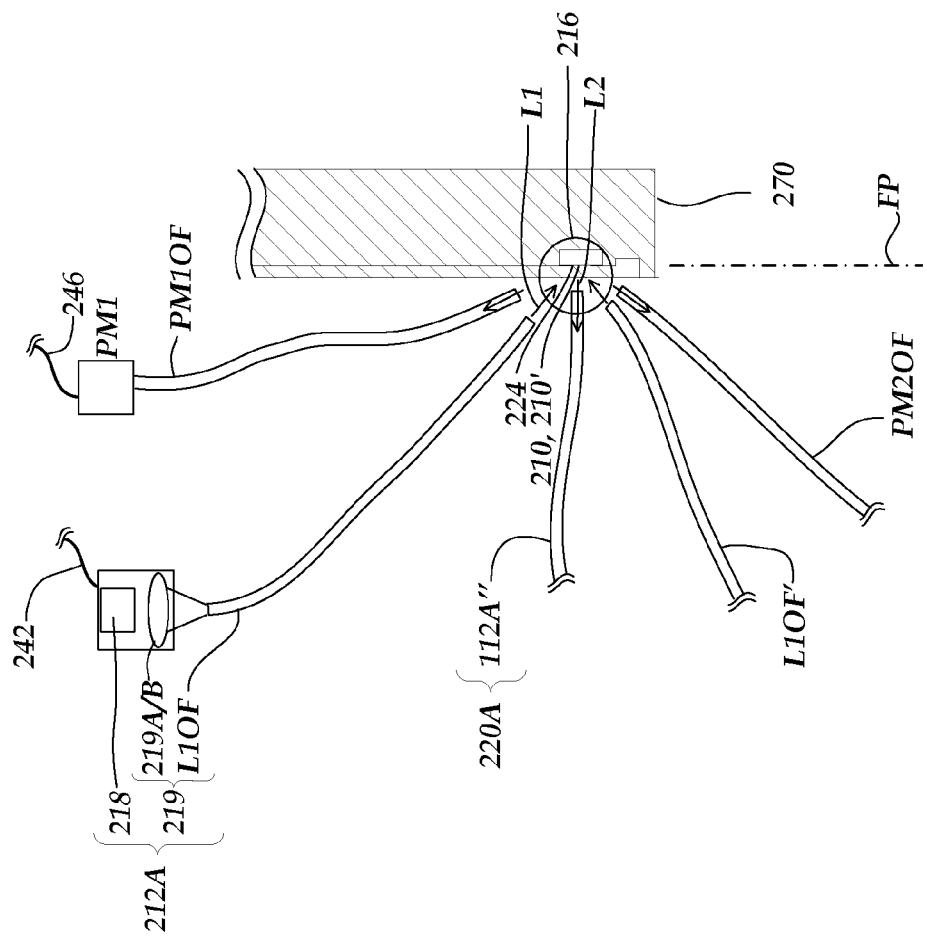
FIG. 3 is a schematic representation of an optical fiber arrangement that may be used as an alternative to various optical elements shown in FIG. 2.

FIG. 3 is a schematic representation of an optical fiber arrangement that may be used as an alternative to various optical elements shown in FIG. 2. Elements providing similar or identical functions in FIGS. 3 and 2 are similarly numbered and may generally be understood by analogy. FIG. 3 shows a portion of the substrate 270 and the emitted light output coupling region 216, shown in FIG. 2. In the embodiment shown in FIG. 3, the configuration includes at least a first excitation light source 212A, which may comprise the light generator 218 and an input light path optical element set 219, which may provide a tightly focused spot efficiently coupled into the excitation input light optical fiber L1OF, which is positioned to emits the excitation input light L1 to the illuminated spot 224, which functions as previously outlined. A similar second excitation light source is optional and may provide additional excitation input light L1 to the illuminated spot 224 through the optical fiber L1OF', if present. The configuration also includes an output path optical element set 220A, which may consist of the optical fiber 112A" and its end, which may receive the output illumination light L2 from the emitted light output coupling region 216 and provide it as illumination light to a host system. The embodiment shown in FIG. 3 includes an optional first energy monitor PM1 which may operate as outlined with reference to FIG. 2, with the exception that it monitors light energy levels based on light received through the optical fiber PM1OF. A similar second energy monitor is also optional, and may monitor light energy levels based on light received through the optical fiber PM2OF, if present. The configuration shown in FIG. 3 may be a simple and economical alternative to various elements shown in FIG. 2, while the various elements and methods disclosed herein may allow the resulting light source to provide a stable and/or predictable illumination spectrum despite its simplicity and economy.

Figure 4:
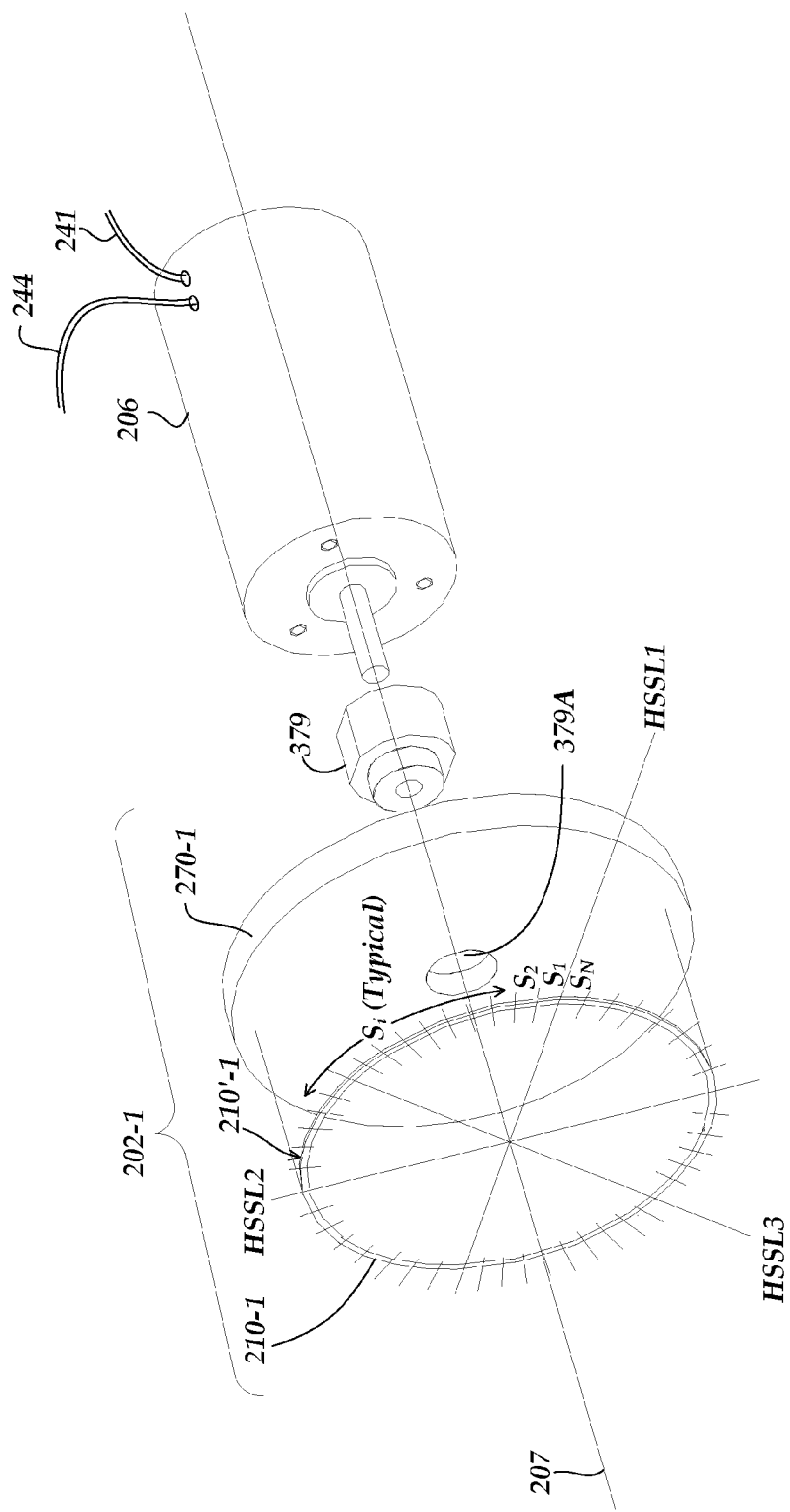
FIG. 4 is an exploded diagram of the rotary actuator and an embodiment of the phosphor point source element of FIG. 3, including schematically illustrated sections of the phosphor point source element which may be associated with section contribution characteristic data.

FIG. 4 is an exploded diagram of the rotary actuator 206 and a first embodiment of a phosphor point source element 202-1 usable in place of the generic phosphor point source element 202 shown in FIG. 2. As shown in FIG. 4, the phosphor point source element 202-1 comprises a substrate 270-1, and a phosphor region 210'-1, which includes an operational track region 210-1. The substrate 270-1 may include a mounting hole 379A, as well as other features described in the '050 Application. FIG. 4 also shows a mounting hub 379, which may engage the mounting hole 379A and/or an adjacent shoulder of the substrate 270-1 for mounting the phosphor point source element 202-1 onto the rotary actuator 206, which rotates the phosphor point source element 202-1 around an axis of rotation 207 under control of signals input on the position control signal line 241. It will be appreciated that although the phosphor region 210'-1 and the operational track region 210-1 appear to be freestanding elements in FIG. 4, they may generally be fabricated as an integrated assembly or element as described in greater detail in the '050 Application. In some embodiments, the rotary actuator 206 may have one or more associated position sensors (e.g., Hall sensors, as discussed further below, or the like), which may be used to detect the rotational position of the phosphor point source element 202-1. The position sensor(s) may output position signals on the position signal line 244.

FIG. 4 also schematically illustrates one exemplary embodiment of sections $S_i$ (e.g., $S_1$, $S_2$, and so on, for a number of sections N) of the phosphor point source element, which have related locations or positions. Each section $S_i$ may be associated with section-specific section contribution characteristic data, which may be used in order to allow output illumination spectrum compensation corresponding to the section contribution characteristics included in an output contribution set, as outlined previously and described in greater detail below. Position signals may be used to identify which section is positioned to receive excitation energy and output illumination light, and to determine when to begin and terminate application of the excitation energy within a section and/or an output contribution set of sections, as described further below.

In one specific example embodiment, suitable for use with a CPS system that provide measurement samples at 30 KHz, for example, the rotary actuator 206 may be a precision motor rotates at approximately 37.5 Krpm, which utilizes speed control including 3 Hall sensors positioned at 120° phase to each other. The signals from the Hall sensors may be associated with illustrated signal locations HSSL1, HSSL2, and HSSL3 on the phosphor point source element. A sample period of 33.33 μs for rotation speed of 37.5 Krpm will correspond to an angular range $\beta$=7.5°, or 48 intervals per complete revolution, which may correspond to the angular location of a section or an output contribution set in some applications. In one specific example, a BLDC-type motor with 3-phase Hall sensors (e.g., Atmel AVR443) may be utilized. The 3-phases can then provide an absolute 60° sector position. That is, at the signal locations HSSL1, HSSL2, and HSSL3, the rising edge of a signal from a Hall sensor can be used as a lock-in for the angular position, and half way in between those locations, the falling edge of the signals may be used (e.g., in conjunction with signals indicating the current flow through the coils/magnetic field generated by the coils in the BLDC-type motor). An additional sector timer (e.g., a clock operating at 500 KHz, 1 MHz, 25 MHz or more) can be utilized in conjunction with a constant or known rotation speed to provide fine position signals between the 60° reference locations. In other embodiments, high-speed digital rotary encoders or other angular encoder methods may also be utilized to provide a desired position resolution.

In another specific example embodiment, smaller sections of the phosphor point source element may be associated with characterization data. The rise/fall time of an excited phosphor may be on the order of approximately 1.5 microseconds. At a rotation speed of ≈20 Krpm (i.e., 20,202 rpm), 1 revolution time=2.97 msec. If a clock increment of 1.5 microseconds is used, then each clock increment may be used to identify one of 0.00297 sec/1.5 E−6 sec=19,800 identifiable sections around an operation track. If the operational track has a radius of 23 mm, then the dimension or section length SL of each identifiable section along the operational track is SL=2*π*23/19,800=0.0073 mm=7.3 um. In some embodiments, this may be significantly less then that size of an average grain of phosphor material. Further, it may be 10 or 20 times smaller than an excitation illumination spot provided by an optical fiber, or a focused light source. Thus, it will be appreciated that extremely small or local variations in section contribution characteristics may be characterized, if desired.

In various embodiments, section contribution characteristic data corresponding to a section may comprise wavelength intensity profile data (sometimes referred to as spectral intensity profile data), such as a wavelength intensity profile characteristic (WIPCi) for a section i, which characterizes the relative energy levels for the various wavelength components that are output at that section. A "wavelength component" may be regarded as corresponding to a small wavelength range, for instance, a small wavelength range increment which is detected by a single detector element (e.g., a pixel, or array element) in a spectrometer or other instrument (e.g., a CPS system) that provides measurements derived from an illumination spectrum output by an illumination system that operates as disclosed herein. In some embodiments, the wavelength intensity profile data is determined based on a measurement of the actual wavelength intensity profile (sometimes referred to as the actual spectral intensity profile) at that section resulting from a known or standard excitation energy. This is particularly preferred when the phosphor material in a section comprises a plurality of phosphor types (e.g., a blend of phosphors). For example, an optical fiber may be connected to carry the output illumination light resulting from the known or standard excitation energy applied at a respective section $S_i$ (e.g., at a particular angular range corresponding to that section, while the phosphor point source element is rotating) directly to an input of a spectrometer (e.g., bypassing the optical pen of a CPS system). The resulting signals on the spectrometer may then be analyzed to determine the actual wavelength intensity profile for that respective section and the corresponding wavelength intensity profile characteristic (WIPCi) may be stored corresponding to the section $S_i$. It will be appreciated that the wavelength intensity profile characteristic (WIPCi) may comprise a set of data or values corresponding to a plurality of wavelength components or constituents output at the section $S_i$.

In some embodiments (e.g., when each section comprises a single type of phosphor material that outputs a characteristic spectrum), the wavelength intensity profile characteristic data for a section may be determined and stored without an actual measurement, based on a predetermined generic wavelength intensity profile corresponding to the phosphor(s) at that section (e.g., according to a predetermined phosphor output specification, preliminary test of a representative phosphor sample, or the like).

In some embodiments, the section contribution characteristic data corresponding to a section may comprise a section efficiency characteristic (SECT) for a section i, which generally reflects the relative efficiency of a section for converting excitation energy to illumination energy (e.g., in comparison to other sections, or a "reference," having the same phosphor composition). In one embodiment, the section efficiency characteristic may characterize the nominal energy output at that section relative to a reference energy level and/or relative to a given excitation energy level. In one embodiment, the section efficiency characteristic data comprise a section efficiency characteristic value that characterizes the output energy for a representative wavelength or wavelength profile for that section, relative to a reference level. In some embodiments, the section efficiency characteristic value may be a ratiometric value based on a measurement of the output energy at that section relative to the excitation energy used to generate that output energy (e.g., where the excitation energy has a measured or a standard value). In other embodiments, the value may be a ratiometric value based on a measurement of the output energy at that section relative to the output energy at another section that has nominally the same phosphor composition, for nominally identical excitation energy at both sections.

Similarly to the procedure outlined above for determining a wavelength intensity profile characteristic, in some embodiments an optical fiber may be connected to carry the output illumination light resulting from the known or standard excitation energy applied at a respective section $S_i$ (e.g., at a particular angular range corresponding to that section, while the phosphor point source element is rotating) directly to an input of a spectrometer (e.g., bypassing the optical pen of a CPS system). The resulting signals on the spectrometer may then be analyzed to determine the actual section efficiency for that respective section, and the corresponding section efficiency characteristic (SECT) may be stored corresponding to the section $S_i$.

In some embodiments, the section contribution characteristic data corresponding to a section may comprise both wavelength intensity profile data and section efficiency characteristic data. In some embodiments, the wavelength intensity profile data and the section efficiency characteristic data may be separate data elements (e.g., in one particular embodiment the wavelength intensity profile data $WIPC_i$ for a section $S_i$ may be a predetermined wavelength intensity profile, and its section efficiency characteristic data SECi may be based on an actual measurement, as outlined above). In some embodiments, the wavelength intensity profile data may inherently include the section efficiency characteristic data. For example, in one particular embodiment, the wavelength intensity profile data may be determined based on a measurement of the actual wavelength intensity profile at a section resulting from a known or standard excitation energy. For example, the measurement may reflect the product $[WIPC_i * SEC_i]$ for section $S_i$. Therefore the relative energy output (that is, the section efficiency characteristic information) at comparable sections (e.g., sections having the same phosphor composition) may be derived from the output levels exhibited in their respective wavelength intensity profile data.

In the illustrated embodiment, the sections $S_i$ are uniformly distributed around the operational track region 210-1. However, this embodiment is exemplary only, and not limiting. Various alternative embodiments of sections and output contribution sets are described in greater detail with reference to FIGS. 5A-5C.

Figure 5B:
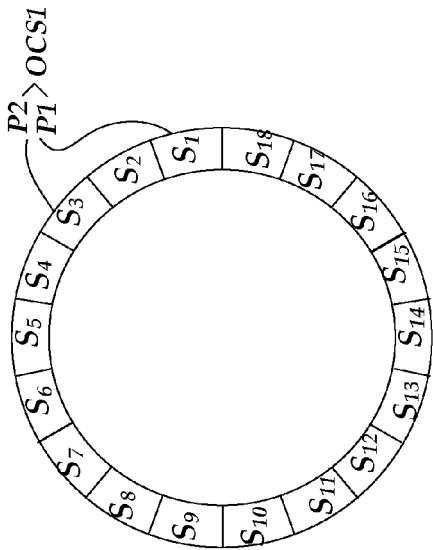
FIGS. 5A-5C are diagrams schematically illustrating some exemplary embodiments of output contribution sets of sections of a phosphor point source element which may be used to contribute to an output illumination spectrum during an illumination period.
Figure 5C:
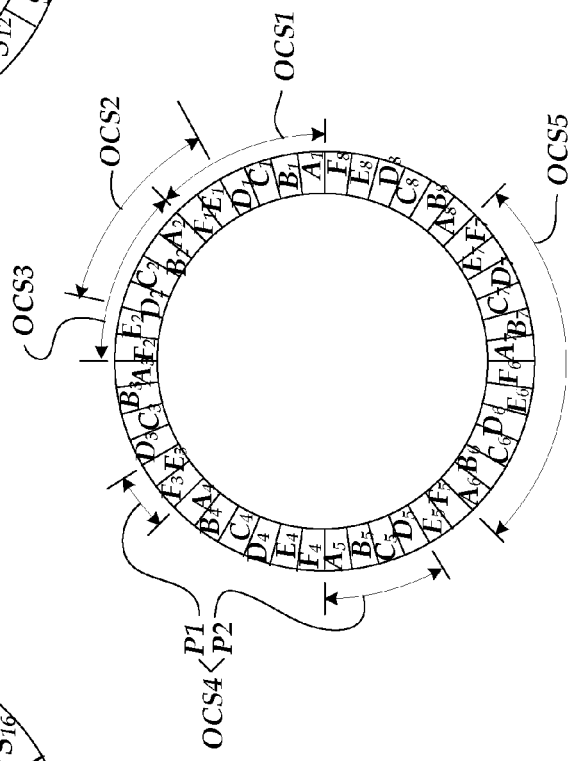
Figure 5A:
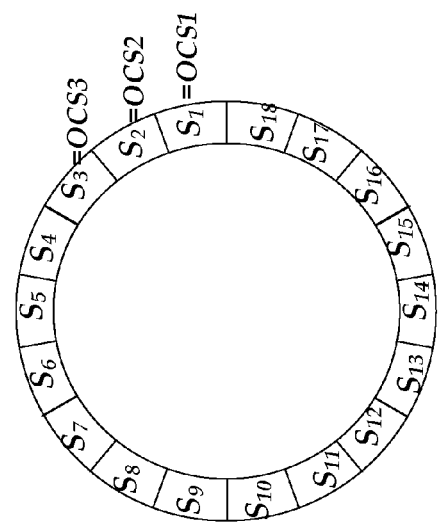

FIGS. 5A-5C are diagrams schematically illustrating some exemplary embodiments of output contribution sets of sections of a phosphor point source element which may be used to contribute to an output illumination spectrum during an illumination period.

FIG. 5A shows an embodiment including 18 sections S1-S18 around an operational track. In one example, such an embodiment may be useful when the operational track comprises a phosphor blend that is intended to be uniform, such that each section Si can be used to provide a corresponding "one member" output contribution set OCSi (e.g., OCS1, OCS2, etc.), which provides a broadband output illumination spectrum. In such a case, one or more output contribution sets and/or sections may include unwanted variations in their wavelength intensity profile characteristics (e.g., variations due to phosphor grain size, phosphor density, or phosphor blend homogeneity, illumination gap or focus variations due to operational track wobble or flatness, and the like). However, each section's wavelength intensity profile characteristic may be measured using a known or standard excitation energy pattern (e.g., constant power) applied over a defined range along the section. Then, related wavelength intensity profile characteristic data may be stored, and when that section is similarly excited over the same range at a later time as a member of an output contribution set, the resulting output illumination spectrum or a measurement based on that spectrum may be compensated based on its wavelength intensity profile characteristic data.

For example, in some embodiments, the illumination wavelength intensity profile IWIPi, contributed by a section i to an output illumination spectrum during an illumination period, may be expressed as:

$$EE_i \times [WIPC_i \times SEC_i] = IWIP_i \qquad (1)$$

where EEi is an excitation energy provided for a section i during the illumination period, WIPCi is the wavelength intensity profile characteristic, and SECi is the section efficiency characteristic, for that section i. It will be understood that the wavelength intensity profile characteristic WIPCi reflects the relative energy or signal strengths for each of the various wavelengths output in response to excitation energy at section i. In contrast, the section efficiency characteristic SECi reflects the average energy or signal strength for section i, relative to the average energy or signal strength provided at comparable sections (e.g., comparable sections having the same phosphor material composition as the section i).

When a single section is used for the output contribution set, the excitation energy EEi and the section efficiency characteristic SECi affect the signal level, but not the peak location in the resulting output illumination spectrum and/or measurement based on that spectrum. Thus, the illumination intensity profile contribution IWIPi may, in some embodiments, be proportional to the wavelength intensity profile characteristic WIPCi.

We may define a measurement effect MEi (e.g., in some embodiments MEi may be understood as a measurement transfer function such as provided by a CPS optical pen operating at a particular measuring distance), such that:

$$IWIP_i \times ME_i = MWIP_i \quad (2)$$

where MWIPi is a contribution to a measurement intensity profile or measurement spectrum arising from the illumination intensity profile contribution IWIPi. Thus, it will be appreciated that when the illumination intensity profile contribution IWIPi is proportional to the wavelength intensity profile characteristic WIPCi, WIPCi may be used to compensate or correct (e.g., normalize) the resulting measurement intensity profile contribution MWIPi, to reflect only the desired measurement effect MEi. For example, in one embodiment, this technique may be implemented in the previously outlined configuration C.

FIG. 5B shows a section arrangement similar to FIG. 5A, In one example, such an embodiment may be useful when the operational track comprises a phosphor blend that is intended to be uniform and a plurality of section Si are used to provide a corresponding "multi-member" output contribution set, which provides a broadband output illumination spectrum. For example, in FIG. 5B, the sections $S_1$ is a first member P1 and $S_3$ is a second member P2 of the output contribution set OCS1. Thus, during an illumination period, the operational track is rotated and the light source is turned on to excite section S1, off to avoid excitation of section S2, and on again to excite section S3. Similarly to the previous discussion of FIG. 5A, the section S1 and S3 sections may include unwanted variations. However, each section's wavelength intensity profile characteristic and section efficiency characteristic may be measured using a known or standard excitation energy pattern. Then, related wavelength intensity profile characteristic data and section efficiency characteristic data may be stored, and when that section is similarly excited at a later time as a member of an output contribution set, the resulting output illumination spectrum, or a measurement based on that spectrum, may be compensated based on the wavelength intensity profile characteristic data and the section efficiency characteristic data of the sections included in the output contribution set.

Based on the discussion of EQUATION 2 above, it will be understood that when an output contribution set comprises a plurality of sections, they all contribute a corresponding measurement intensity profile contribution MWIPi, and the total corresponding measurement intensity profile or measurement spectrum $MWIP_{sample}$ may be expressed as:

$$MWIP_{sample} = \sum_{sample\_i's} MWIP_i \quad (3)$$

However, in contrast to the previous discussion where the output contribution set consists of a single section, when the output contribution set comprises multiple sections, their respective wavelength intensity profile characteristic WIPCi must, in general, be weighted by their respective excitation energy and section efficiency characteristic as shown in EQUATION 1, prior to their combination according to EQUATION 3. However, if the excitation energy is the same for each section, it may be ignored in some embodiments.

As previously indicated, in some embodiments, the wavelength intensity profile data may inherently include the section efficiency characteristic data. For example, in one particular embodiment the wavelength intensity profile data for a section may be determined based on a measurement of the actual wavelength intensity profile at that section resulting from a known or standard excitation energy. For example, the measurement may reflect the product $[WIPC_i * SEC_i]$ for section $S_i$. In other words, with the discussion of EQUATION 1 as background, a measured illumination intensity profile contribution IWIPi for a given excitation energy EEi may be reflected in the following expression:

$$[WIPC_i \times SEC_i] = IWIP_i | EE_i = SCC_i \quad (4)$$

such that a section wavelength intensity profile characteristic and a section efficiency characteristic may both be reflected in the overall section contribution characterization SCCi defined above, which can be substituted into EQUATION 1:

$$EE_i \times SCC_i = IWIP_i \quad (5)$$

and used accordingly, in various embodiments (e.g., as reflected for IWIPi in EQUATIONS 2 and 3).

The techniques outlined above with reference to FIG. 5B may be implemented in the previously outlined configuration C. Alternatively, the sections S1-S18 may be measured and their respective contributions characterized as outlined above. Then sections that have offsetting or compensating wavelength intensity profiles (e.g., S1 and S3 in this example) may be selected as the sections to be combined in an output contribution set. To cite as simple example, S1 and S3 may be selected because one of them has an unwanted high variation at a particular wavelength component and the other has an unwanted low variation at that particular wavelength component. Of course, in principle, additional sections could be selected and combined in an analogous similar manner. Advantageous combinations may be identified by analysis of the their contribution characteristics and locations along the operational track. This technique may be implemented in the previously outlined configuration B, for example. The technique may also include using different excitation energies in the respective sections, to weight their compensation effects in a desirable manner.

It should also be appreciated that, in general, a "section" may be defined as any combination of portions of the operational track which may be excited in a known excitation energy pattern along the portions, characterized based on that excitation energy pattern, and then operated using that excitation energy pattern. For example, S1 and S3 may be considered sub-sections under this interpretation and with their combination considered as a section which may be characterized by a single section wavelength intensity profile characteristic and section efficiency characteristic, or overall section contribution characterization SCCi. Any such section comprising a plurality of adjacent or non-adjacent portions may be used according to the equations and teachings outlined above.

FIG. 5C shows a section arrangement comprising a repeated arrangement of sections A-F, labeled as $A_1$-$F_1$, $A_2$-$F_2$, etc. In one example, such an embodiment may be useful when the operational track comprises respective phosphor material types A, B, C, D, E, and F, such that each contribute to a respective wavelength portion of a desired broadband output illumination spectrum. For example, in FIG. 5C, the sections $A_1$-$F_1$ are members of the output contribution set OCS1, and sections $E_1$, $F_1$, and $A_2$-$D_2$ are members of the output contribution set OCS2, and so on. In general, any set of sections A-F, may form an output contribution set that provides the same output illumination spectrum, if the sections are given the proper excitations energies to compensate for any unwanted variations. Assuming that each section of a particular type of phosphor has the same wavelength intensity profile (e.g., such that they may be generically characterized), only their respective section efficiency characteristics need to be individually characterized and compensated (e.g., to compensate for section efficiency variations due to phosphor grain size, phosphor density or illumination gap or focus variations due to operational track wobble or flatness, and the like). For example, each section of a particular type (e.g., type A, etc.) may be excited such that ($EE_{Ai} * SEC_{Ai}$) is the same for all sections A, and so for sections B, C, etc. Then the wavelength intensity profile corresponding to the various output contribution sets OCS1-OCS5 will be nominally identical. This technique may be implemented in the previously outlined configuration A, for example. It will be noted that the output contribution sets OCS5 includes twice as many sections as the other sets. To provide the same overall output level as other sets (if desired) its excitation energies may be relatively reduced (e.g., by half). It will be apparent that other output contribution sets that provide a similar output illumination spectrum may be constructed based on the teachings outlined above. Of course, rather than adjust the excitation energies to provide an "ideal" output illumination spectrum, the arrangement of FIG. 5C and known section wavelength profile characteristics and section efficiency characteristics may be used in conjunction with known excitation energies (or a constant but unknown excitation energy) to implemented compensation according to the previously outlined configuration C, for example. It should be appreciated that although the illustrations of FIGS. 5A-5C show sections having equal lengths, the sections are not so limited. More generally, any section may have any convenient length. For example, sections or phosphors having a generally lower overall efficiency may be made longer than higher efficiency sections, such that all respective wavelength contributions may be more easily balanced to provide a desired spectrum when using a constant excitation power within an output contribution set. Alternatively, and more generally, it will be appreciated that the excitation energy EEi applied to a section may be controlled by controlling the excitation power EPi and/or the excitation duration ETi within the section. Of course, for a given rate of rotation a longer excitation duration ETi will require a larger angular range or length within a section.

$$EE_i = EP_i \times ET_i \quad (6)$$

In some embodiments, excitation light source power is more predictable if it is fixed, and it is preferred to control the excitation energy in a section based on the excitation duration.

Based on teachings included above, it will be appreciated that in some embodiments, an excitation light source (e.g., a diode laser used as the light source 212 of FIG. 2) may be precisely controlled so as to illuminate precisely selected sections (possible as small as individual grains of phosphor) in a controlled manner so as to produce an extremely repeatable output illumination spectrum. For example, in one embodiment, based on synchronization with the precisely known position of the phosphor disk, and according to teachings outlined above, a 22 bit stream of on-off control signals with a bit duration of 1.5 microseconds may control an excitation light source as to yield a compensated (e.g., desired) output illumination spectrum, or a characterized spectrum that can be computationally compensated, in 33 microseconds. In one specific example, such an output illumination spectrum may be provided starting at any of 19,800 distinct locations around an operational track (e.g., using the repetitive section arrangement of FIG. 5C, with shorter sections).

When a measurement application requires the absolute maximum degree of repeatability, the previously outlined configuration D may be used, at the expense of a slower measurement rate (which allows for the operational track to make one revolution such that the same sections of the track may be used for sequential illumination periods). The various configurations A, B, C, and D may be used in various combinations, if desired.

Figure 6:
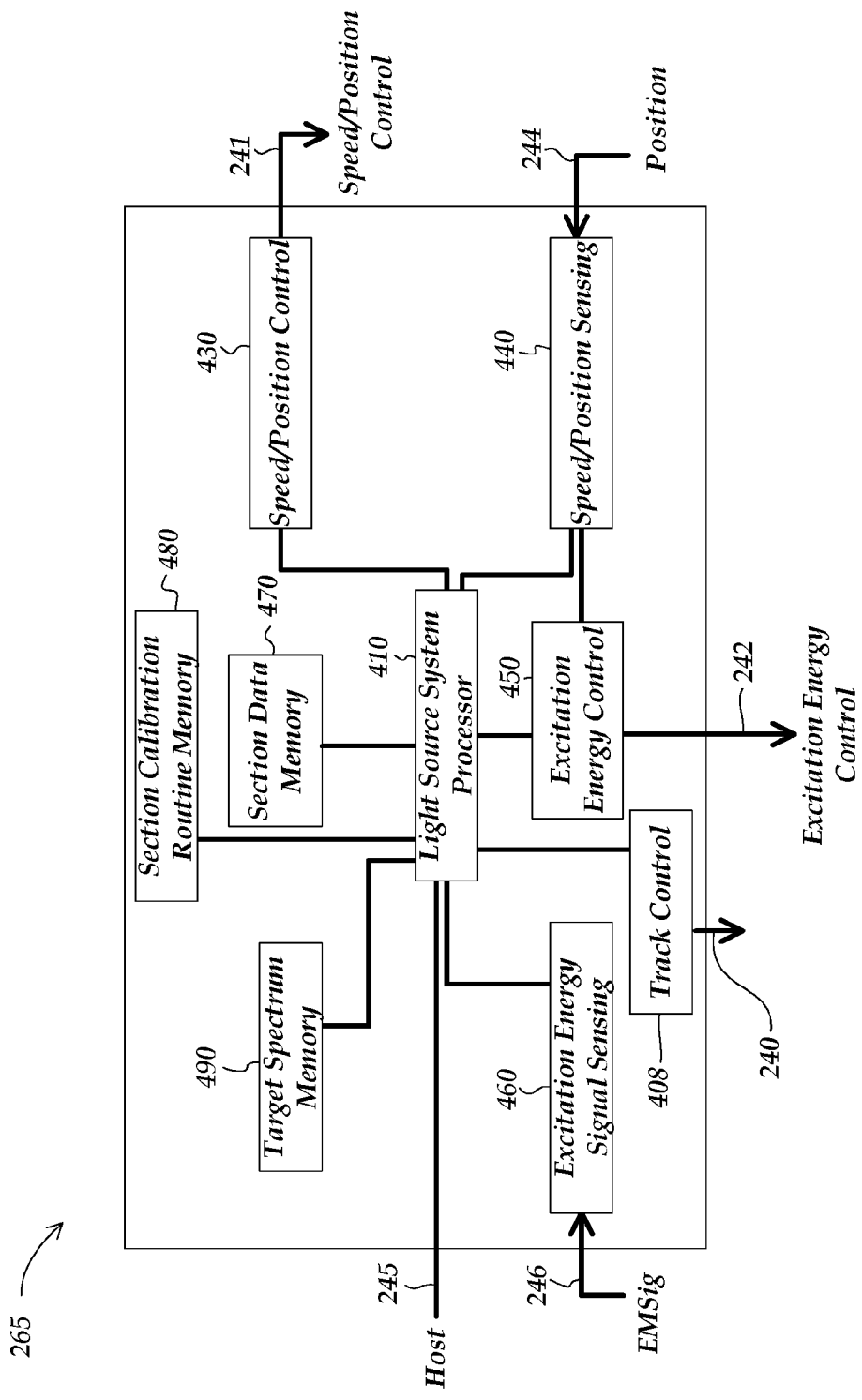
FIG. 6 is a block diagram of the light source controller of FIG. 2.

FIG. 6 is a block diagram of an exemplary embodiment of the light source controller 265 (also referred to as the illumination system controller 265) of FIG. 2, which may be used to control an illumination system according to the various methods and operations disclosed herein. As shown in FIG. 6, the light source controller 265 includes a light source system processor 410 (also referred to as the illumination system processor 265), which is coupled by the signal line(s) 245 to the host system controller 166' of FIG. 2. The light source system processor 410 is also coupled to a speed/position control element 430, which provides signals on the control signal line 241 for the speed/position control of the phosphor point source element 202. The position signal line 244, which indicates the rotary position of the phosphor point source element 202 (e.g., as may be provided by Hall sensors or other elements as will be described in more detail below), is received by a speed/position sensing element 440, which is coupled to the light source system processor 410, as well as being coupled to a excitation energy control element 450. The excitation energy control element 450 is also coupled to the light source system processor 410 and provides the excitation energy control signal 242 for controlling the excitation energy provided by the excitation light source 212 as illustrated in FIG. 2 and according to teachings disclosed herein. Energy sensing element 460 is also coupled to the light source system processor 410 and receives the energy monitor signal EMSig on the line 246 from the energy monitor PM1 (and from the energy monitor PM2 when such is utilized). As outlined previously, the energy monitor signal EMSig, may reflect a sensed excitation energy or a resulting output illumination energy associated with the first excitation light source 212 (and by the second excitation light source 212' when such is utilized).

As previously outlined, the light source controller 265 may also include a section data memory 470, and optionally a section calibration routine memory 480 (e.g., for implementing methods outlined above for measuring the section contribution characteristics and storing related data in the section data memory 470) and a target spectrum memory 490 (e.g., to use when configuring the light source controller 265 to provide a pre-defined output illumination spectrum which matches an entry in the target spectrum memory 490), which may be coupled to the illumination system processor 410 for use during certain measurement operations.

Figure 7A:
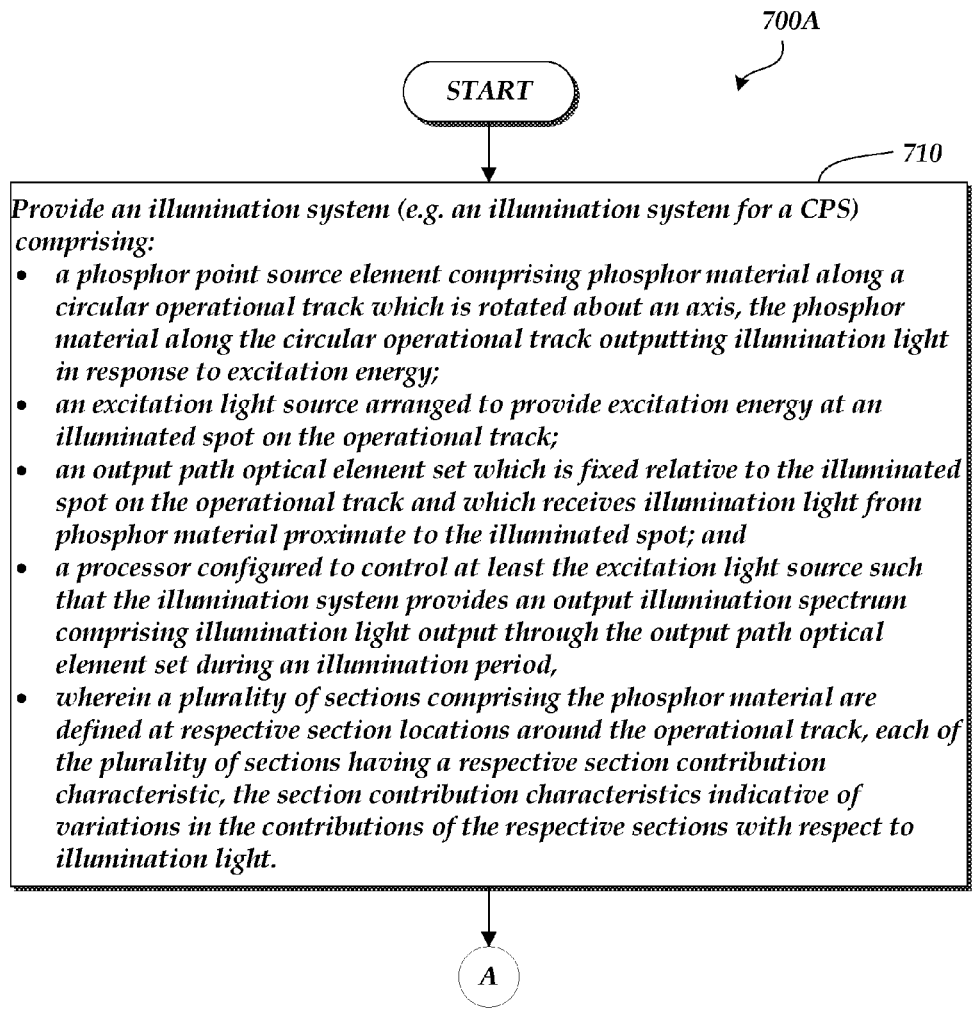
FIGS. 7A and 7B depict a flow diagram illustrating an exemplary general routine for operating an illumination system according to various embodiments disclosed herein.
Figure 7B:
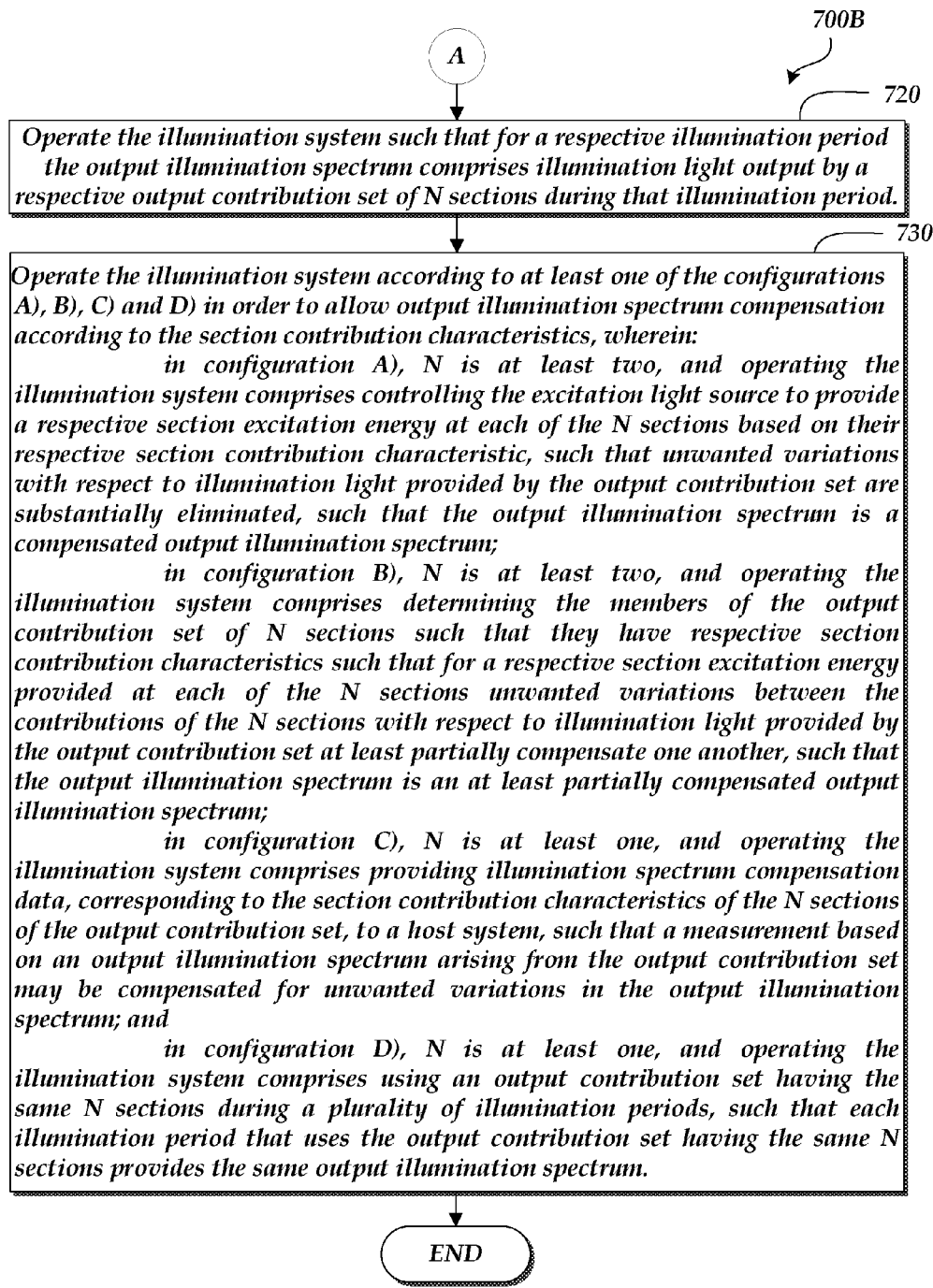

FIGS. 7A and 7B are first and second portions 700A and 700B, respectively, of a flow diagram of an exemplary routine for operating an illumination system according to various embodiments disclosed herein. In FIG. 7A, at a block 710, an illumination system is provided. In some embodiments the illumination system is connected to a host system or may be merged with, or embedded within, a host system (e.g., a CPS system). However, in other embodiments, the illumination system may stand alone. The illumination system comprises: a phosphor point source element comprising phosphor material along a circular operational track which is rotated about an axis, the phosphor material along the circular operational track outputting illumination light in response to excitation energy; an excitation light source arranged to provide excitation energy at an illuminated spot on the operational track; an output path optical element set which is fixed relative to the illuminated spot on the operational track and which receives illumination light from phosphor material proximate to the illuminated spot; and a processor configured to control at least the excitation light source such that the illumination system provides an output illumination spectrum comprising illumination light output through the output path optical element set during an illumination period, wherein a plurality of sections comprising the phosphor material are defined at respective section locations around the operational track, each of the plurality of sections having a respective section contribution characteristic, the section contribution characteristics indicative of variations in the contributions of the respective sections with respect to illumination light.

The routine then continues from block 710 to point "A" in FIG. 7A, which continues at point "A" in FIG. 7B. In FIG. 7B, from point "A", the routine continues to block 720, where the illumination system is operated such that for a respective illumination period the output illumination spectrum comprises illumination light output by a respective output contribution set of N sections during that illumination period. Then, at a block 730, the illumination system is furthermore operated according to at least one of the configurations (A), (B), (C), and (D) in order to allow output illumination spectrum compensation according to the section contribution characteristics. In the configuration (A), N is at least two, and operating the illumination system comprises controlling the excitation light source to provide a respective section excitation energy at each of the N sections based on their respective section contribution characteristic, such that unwanted variations with respect to illumination light provided by the output contribution set are substantially eliminated, such that the output illumination spectrum is a compensated output illumination spectrum. In the configuration (B), N is at least two, and operating the illumination system comprises determining the members of the output contribution set of N sections such that they have respective section contribution characteristics such that for a respective section excitation energy provided at each of the N sections unwanted variations between the contributions of the N sections with respect to illumination light provided by the output contribution set at least partially compensate one another, such that the output illumination spectrum is an at least partially compensated output illumination spectrum. In the configuration (C), N is at least one, and operating the illumination system comprises providing illumination spectrum compensation data, corresponding to the section contribution characteristics of the N sections of the output contribution set, to a host system, such that a measurement based on an output illumination spectrum arising from the output contribution set may be compensated for unwanted variations in the output illumination spectrum. In the configuration (D), N is at least one, and operating the illumination system comprises using an output contribution set having the same N sections during a plurality of illumination periods, such that each illumination period that uses the output contribution set having the same N sections provides the same output illumination spectrum.

The configurations A, B, C, and D may be implemented according to various embodiments as previously outlined and may be used in various combinations. In various embodiments, the section contribution characteristic data may be determined and stored according to teachings previously outlined herein, such that the data may be used according to the routine of FIGS. 7A and 7B. In various embodiments, compensation according to the various configurations A, B, C, and D may be provided according to teachings previously outlined herein.

While various exemplary embodiments of the present invention have been illustrated and described, numerous variations in the illustrated and described arrangements of features and sequences of operations will be apparent to one skilled in the art based on this disclosure. For example, the shape and/or configuration of the phosphor point source element 202 is not limited to a wheel type configuration that rotates around an axis and may include any other shape that may rotate around an axis and/or any other shape that may be displaced linearly (e.g., a reciprocating phosphor point source element) relative to an input and output light location. Furthermore, it will be appreciated that the various exemplary dimensions outlined previously are particularly suitable for systems which benefit from small optical fiber diameters, compact construction, and very short pulse durations. However, it will be appreciated that other systems may use dimensions other than those outlined above. Thus, it will be appreciated that various changes according to the teachings herein can be made to the various particular embodiments outlined above without departing from the spirit and scope of the invention.

The embodiments of the invention in which an exclusive property or privilege is claimed are defined as follows:

1. An illumination system, comprising:
a phosphor point source element comprising phosphor material along a circular operational track which is rotated about an axis, the phosphor material along the circular operational track outputting illumination light in response to excitation energy;
an excitation light source arranged to provide excitation energy at an illuminated spot on the operational track;
an output path optical element set which is fixed relative to the illuminated spot on the operational track and which receives illumination light from phosphor material proximate to the illuminated spot; and
a processor configured to control at least the excitation light source such that the illumination system provides an output illumination spectrum comprising illumination light output through the output path optical element set during an illumination period, wherein:
a plurality of sections comprising the phosphor material are defined at respective section locations around the operational track, each of the plurality of sections having a respective section contribution characteristic, the section contribution characteristics indicative of variations in the contributions of the respective sections with respect to illumination light;
the illumination system is configured such that for a respective illumination period the output illumination spectrum comprises illumination light output by an output contribution set comprising N sections during that illumination period; and
the illumination system is configured to operate in at least one of the configurations (A), (B), (C), and (D) in order to allow output illumination spectrum compensation corresponding to the section contribution characteristics of the output contribution set, wherein:
in configuration (A), N is at least two, and the excitation light source is controlled such that a respective section excitation energy provided at each of the N sections is based on their respective section contribution characteristic to substantially eliminate unwanted variations with respect to illumination light provided by the output contribution set, such that the output illumination spectrum is a compensated output illumination spectrum;

in configuration (B), N is at least two, and the members of the output contribution set of N sections have respective section contribution characteristics such that for a respective section excitation energy provided at each of the N sections unwanted variations between the contributions of the N sections with respect to illumination light provided by the output contribution set at least partially compensate one another, such that the output illumination spectrum is an at least partially compensated output illumination spectrum;

in configuration (C), N is at least one, and the illumination system is configured to provide illumination spectrum compensation data, corresponding to the section contribution characteristics of the N sections of the output contribution set, to a host system, such that a measurement based on an output illumination spectrum arising from the output contribution set may be compensated for unwanted variations in the output illumination spectrum; and in configuration (D), N is at least one, and the illumination system is configured to use an output contribution set having the same N sections during a plurality of illumination periods, such that each illumination period that uses the output contribution set having the same N sections provides the same output illumination spectrum.

2. The illumination system of claim 1, wherein each respective section contribution characteristic comprises at least one of a section efficiency characteristic indicative of an overall energy conversion efficiency of that section and a section wavelength intensity profile characteristic indicative of the relative energy levels of wavelength components that are output at that section.

3. The illumination system of claim 1, wherein the illumination system comprises a section data memory, and respective section data corresponding to the respective section contribution characteristics is stored in the section data memory for a plurality of sections.

4. The illumination system of claim 3, wherein the respective section data corresponding to the respective section contribution characteristics comprises section wavelength intensity profile characteristics, and each respective section wavelength intensity profile characteristic is based on an actual measurement of the corresponding section.

5. The illumination system of claim 4, wherein:

each of the plurality of sections comprises blended phosphor material that provides a broadband output illumination spectrum; and the illumination system is configured to operate in configuration (C), wherein:

the illumination system is configured to output illumination spectrum compensation data based on at least the section wavelength intensity profile characteristic data of the output contribution set of N sections to the host system, such that a measurement based on the broadband output illumination spectrum arising from the output contribution set of N sections may be compensated for unwanted variations in that broadband output illumination spectrum which correspond to the section wavelength intensity profile characteristics of that output contribution set of N sections.

6. The illumination system of claim 5, wherein:
N is at least two;
the respective section data comprises section efficiency characteristic data;
the illumination system is configured such that respective section excitation energies provided at each of the output contribution set of N sections are known relative to one another; and the illumination system is configured to output illumination spectrum compensation data based on at least the section efficiency characteristic data and the section wavelength intensity profile characteristic data of the output contribution set of N sections to the host system, such that a measurement based on the broadband output illumination spectrum arising from the output contribution set of N sections may be compensated for unwanted variations in that broadband output illumination spectrum which correspond to the section efficiency characteristics and the section wavelength intensity profile characteristics of that output contribution set of N sections.

7. The illumination system of claim 6, wherein the output illumination spectrum compensation data is based on at least the section efficiency characteristic data, the section wavelength intensity profile characteristic data, and the respective section excitation energies provided at each of the output contribution set of N sections that are known relative to one another.

8. The illumination system of claim 3, wherein the respective section data corresponding to the respective section contribution characteristics comprises section efficiency characteristics and each respective section efficiency characteristic is based on an actual measurement of the corresponding section.

9. The illumination system of claim 8, wherein:

each section of the output contribution set of N sections comprise a respective phosphor material that contributes to a respective portion of a broadband output illumination spectrum; and the illumination system is configured to operate in configuration (C), wherein:

N is at least two; and the illumination system is configured such that respective section excitation energies provided at each of the output contribution set of N sections are known relative to one another;

the illumination system is configured to output illumination spectrum compensation data based on at least the section efficiency characteristic data of the output contribution set of N sections to the host system, such that a measurement based on the broadband output illumination spectrum arising from the output contribution set of N sections may be compensated for unwanted variations in that broadband output illumination spectrum which correspond to the section efficiency characteristics of that output contribution set of N sections.

10. The illumination system of claim 9, wherein:
the respective section data comprises section wavelength intensity profile characteristic data; and
the illumination system is configured to output illumination spectrum compensation data based on at least the section efficiency characteristic data and the section wavelength intensity profile characteristic data of the output contribution set of N sections to the host system, such that a measurement based on the broadband output illumination spectrum arising from the output contribution set of N sections may be compensated for unwanted variations in that broadband output illumination spectrum which corresponds to the section efficiency characteristics and the section wavelength intensity profile characteristics of that output contribution set of N sections.

11. The illumination system of claim 10, wherein the section wavelength intensity profile characteristic data for each respective section comprises at least one of (a) identification of its respective type of phosphor material, (b) generic wavelength intensity profile characteristic data corresponding to its respective type of phosphor material, and (c) measured wavelength intensity profile characteristic data.

12. The illumination system of claim 9, wherein the output illumination spectrum compensation data is based on at least the section efficiency characteristic data, the section wavelength intensity profile characteristic data and the respective section excitation energies provided at each of the output contribution set of N sections that are known relative to one another.

13. The illumination system of claim 8, wherein each section of the output contribution set of N sections comprises a respective phosphor material that contributes to a respective portion of a broadband output illumination spectrum and the illumination system is configured to operate in configuration (A).

14. The illumination system of claim 13, wherein the section efficiency characteristic data for each respective section comprises at least one of (a) a section efficiency value, and (b) an excitation energy control value that compensates for the section efficiency characteristic.

15. The illumination system of claim 1, wherein the illumination system is configured to control at least one of the power level and the operating duration of the excitation light source in each of the N sections, in order to control the respective section excitation energy provided in each of the N sections.

16. The illumination system of claim 15, wherein the illumination system is configured such that the power level of the excitation light source is the same in each of the N sections and the processor controls the operating duration of the excitation light source in each of the N sections, in order to control the respective section excitation energy provided at each of the N sections.

17. The illumination system of claim 15, wherein the illumination spot has a dimension D along the direction of the operational track, and at least some of the N sections have a dimension SL along the direction of the operation track, which is less than 10 D.

18. The illumination system of claim 15, wherein the dimension D is at most 200 microns and includes at least 90% of the energy of the illumination spot.

19. The illumination system of claim 1, wherein the illumination spot has a dimension D along the direction of the operational track, and at least some of the N sections have a dimension SL along the direction of the operation track, which is less than 20 D.

20. The illumination system of claim 1, wherein the illumination system is configured to operate in configuration (B).

21. The illumination system of claim 1, wherein the illumination system is configured to operate in configuration (D), in conjunction with at least one of the configurations (A), (B), and (C).

22. A method for operating an illumination system, wherein:
   the illumination system comprises:
      a phosphor point source element comprising phosphor material along a circular operational track which is rotated about an axis, the phosphor material along the circular operational track outputting illumination light in response to excitation energy;
      an excitation light source arranged to provide excitation energy at an illuminated spot on the operational track;
      an output path optical element set which is fixed relative to the illuminated spot on the operational track and which receives illumination light from phosphor material proximate to the illuminated spot; and
      a processor configured to control at least the excitation light source such that the illumination system provides an output illumination spectrum comprising illumination light output through the output path optical element set during an illumination period;
      wherein a plurality of sections comprising the phosphor material are defined at respective section locations around the operational track, each of the plurality of sections having a respective section contribution characteristic, the section contribution characteristics indicative of variations in the contributions of the respective sections with respect to illumination light, and
   the method comprises:
      operating the illumination system such that for a respective illumination period the output illumination spectrum comprises illumination light output by a respective output contribution set of N sections during that illumination period; and
      operating the illumination system according to at least one of the configurations (A), (B), (C), and (D) in order to allow output illumination spectrum compensation according to the section contribution characteristics, wherein:
         in configuration (A), N is at least two, and operating the illumination system comprises controlling the excitation light source to provide a respective section excitation energy at each of the N sections based on their respective section contribution characteristic, such that unwanted variations with respect to illumination light provided by the output contribution set are substantially eliminated, such that the output illumination spectrum is a compensated output illumination spectrum;
         in configuration (B), N is at least two, and operating the illumination system comprises determining the members of the output contribution set of N sections such that they have respective section contribution characteristics such that for a respective section excitation energy provided at each of the N sections unwanted variations between the contributions of the N sections with respect to illumination light provided by the output contribution set at least partially compensate one another, such that the output illumination spectrum is an at least partially compensated output illumination spectrum;
         in configuration (C), N is at least one, and operating the illumination system comprises providing illumination spectrum compensation data, corresponding to the section contribution characteristics of the N sections of the output contribution set, to a host system, such that a measurement based on an output illumination spectrum arising from the output contribution set may be compensated for unwanted variations in the output illumination spectrum; and
         in configuration (D), N is at least one, and operating the illumination system comprises using an output contribution set having the same N sections during a plurality of illumination periods, such that each illumination period that uses the output contribution set having the same N sections provides the same output illumination spectrum.

* * * * *